(12) United States Patent
Wachi

(10) Patent No.: US 7,161,645 B2
(45) Date of Patent: Jan. 9, 2007

(54) MULTI-GAP TYPE TRANSFLECTIVE LIQUID CRYSTAL DISPLAY INCLUDING A RESIN LAYER WITH TAPERS OF DIFFERENT ANGLES

(75) Inventor: Reiko Wachi, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/760,176

(22) Filed: Jan. 16, 2004

(65) Prior Publication Data

US 2004/0183084 A1 Sep. 23, 2004

(30) Foreign Application Priority Data

Jan. 17, 2003 (JP) .............................. 2003-009908
Oct. 31, 2003 (JP) .............................. 2003-372603

(51) Int. Cl.
*G02F 1/1335* (2006.01)

(52) U.S. Cl. ...................... 349/106; 349/113; 349/114; 257/59; 257/72

(58) Field of Classification Search ................ 349/106, 349/113, 114; 257/59, 72
See application file for complete search history.

(56) References Cited

U.S. PATENT DOCUMENTS 6,563,554 B1 * 5/2003 Okamoto et al. ............. 349/12

2002/0063834 A1 5/2002 Sawasaki et al.

FOREIGN PATENT DOCUMENTS

| JP | 08-321025 | 12/1996 |
|---|---|---|
| JP | 08-327814 | 12/1996 |
| JP | 09-068721 | 3/1997 |
| JP | 11-006914 | 2/1999 |
| JP | 11-101992 | 4/1999 |
| JP | 11-242226 | 9/1999 |
| JP | 11-248921 | 9/1999 |
| JP | 2001-042332 | 2/2001 |
| JP | 2002-268200 | 9/2002 |
| JP | 2002-303872 | 10/2002 |
| JP | 2002-323705 | 11/2002 |

OTHER PUBLICATIONS

Communication from Korean Patent Office re: related application.
Examination result issued in corresponding Chinese application.

* cited by examiner

*Primary Examiner*—Thien F. Tran
(74) *Attorney, Agent, or Firm*—Harness, Dickey & Pierce, P.L.C.

(57) ABSTRACT

An electro-optical device is provided. The electro-optical device includes a pair of substrates, an electro-optical material held between the pair of substrates by a sealant, and a resin layer provided on at least one substrate of the pair of substrates. Tapers of the resin layer have a plurality of different angles.

1 Claim, 15 Drawing Sheets

PROCESS 2 OF MANUFACTURING THE MULTI-GAP TYPE COLOR FILTER SUBSTRATE

P04 PATTERNNING THE OVERCOAT FILM

P05 FORMING A TRANSPARENT ELECTRODE

MULTI-GAP TYPE TRANSFLECTIVE LIQUID CRYSTAL DISPLAY INCLUDING A RESIN LAYER WITH TAPERS OF DIFFERENT ANGLES

BACKGROUND OF THE INVENTION

1. Field of the Invention

The present invention relates to a substrate for an electro-optical device, and more specifically, the invention relates to a color filter substrate for a transflective liquid crystal display, a color filter substrate for a multi-domain vertical alignment mode liquid crystal display (MVA-LCD), and a method of manufacturing the same. Further, the present invention relates to an electro-optical device utilizing the color filter substrate, and an electronic apparatus provided with the electro-optical device.

2. Description of the Related Art

Liquid crystal displays are commonly mounted in electronic apparatuses such as cellular phones and portable personal computers. In particular, transflective liquid crystal displays capable of displaying images in both a transmissive display mode and a reflective display mode have been widely used.

The transflective liquid crystal display mainly has a structure in which a liquid crystal layer in a twisted nematic (TN) mode is interposed between a first substrate, on which a first transparent electrode is formed, and a second substrate, on which a second transparent electrode is formed, which faces the first substrate. A light reflecting film forming a reflective display region is formed on the first substrate in a pixel region where the first transparent electrode faces the second transparent electrode. A region corresponding to an aperture provided in the light reflecting film is a transmissive display region. A polarizer, a retardation film, etc., are arranged outside each of the first substrate and the second substrate. Further, a backlight unit for transmissive display is arranged outside the polarizer on the first substrate side on which the light reflecting film is formed.

In the transflective liquid crystal display, among light components emitted from the backlight unit, light components incident on the transmissive display region are incident on the liquid crystal layer from the first substrate side, are light-modulated in the liquid crystal layer, and are emitted from the second substrate side as transmissive display light, thereby displaying images (a transmissive display mode).

Further, among external light components incident from the second substrate side, light components incident on a reflective display region reach the light reflecting film through the liquid crystal layer, are reflected by the light reflecting film, and are emitted from the second substrate side after again passing through the liquid crystal layer as reflective display light, thereby displaying images (a reflective display mode).

Color filters for reflective display and color filters for transmissive display are formed on the first substrate in the reflective display region and the transmissive display region, respectively. Therefore, color display can be performed in both the transmissive display mode and the reflective display mode.

As mentioned above, when the liquid crystal layer modulates light, changes in the polarization state are based on a function of the product (retardation: $\Delta n \cdot d$) of a refractive index difference $\Delta n$ and a liquid crystal layer thickness d. Therefore, when the refractive index difference $\Delta n$ and the liquid crystal layer thickness d are made appropriate, it is possible to display images with improved visibility. However, in the transflective liquid crystal display, the transmissive display light is emitted after passing through the liquid crystal layer once whereas the reflective display light passes through the liquid crystal layer twice. Therefore, it is difficult to simultaneously optimize the retardation in both the transmissive display light and the reflective display light. That is, when the thickness d of the liquid crystal layer is set so that the visibility of the liquid crystal display is improved in the reflective display mode, display in the transmissive display mode is sacrificed. To the contrary, when the liquid crystal thickness d is set so that the visibility of the liquid crystal display is improved in the transmissive display mode, display in the reflective display mode is sacrificed.

In consideration of the above problems, a transflective liquid crystal display having a structure in which the thickness of the liquid crystal layer in the reflective display region is smaller than the thickness of the liquid crystal layer in the transmissive display region is disclosed. Such a liquid crystal display is referred to as a multi-gap type liquid crystal display.

The multi-gap type transflective liquid crystal display can be realized by forming an overcoat layer on the reflective display region, specifically, on the color filters for reflective display in order to control the thickness d of the liquid crystal layer. At this time, the overcoat layer is not formed on the color filters for transmissive display. In short, the thickness d of the liquid crystal layer in the transmissive display region increases by such an extent that the overcoat layer is not arranged compared with the reflective display region. Therefore, it is possible to optimize retardations with respect to both the transmissive display light and the reflective display light, and thereby display images with improved visibility in both the transmissive display mode and the reflective display mode.

In the multi-gap type transflective liquid crystal display, the thickness d of the liquid crystal layer is optimized in the reflective display region and the transmissive display region by forming an overcoat film on the substrate.

However, as mentioned above, in the multi-gap type transflective liquid crystal display, the overcoat film is formed under the pixel electrode (the transparent electrode) in order to control the thickness d of the liquid crystal layer in the transmissive display region and the reflective display region. That is, in the reflective display region, the overcoat layer is formed on the color filters for reflective display. Therefore, the pixel electrode (the transparent electrode) is formed on the overcoat layer. In the transmissive display region, the overcoat layer is not formed. Therefore, the pixel electrode (the transparent electrode) on the color filters for transmissive display is formed without the overcoat film. Even when the overcoat film is formed in the transmissive display region, the overcoat film having a substantially smaller thickness than the thickness of the overcoat film in the reflective display region is formed. Tapers are formed in the overcoat film in the display region in order to change the thickness of the overcoat layer.

In general, the taper of the overcoat film in the display region of the multi-gap type transflective liquid crystal display needs to be significantly inclined with respect to the surface of the overcoat film in the reflective display region in order to improve the contrast. This is because the thickness d of the liquid crystal layer positioned on the taper of the overcoat film, i.e., the surface of an inclined plane, significantly affects the contrast of the liquid crystal display.

As mentioned above, the multi-gap type transflective liquid crystal display is optically designed by examining the optimal value of the retardation. That is, since the thickness d of the liquid crystal layer significantly affects the value of the retardation, a panel is designed so that the optimal value of the thickness d of the liquid crystal layer is obtained in the reflective display region and the transmissive display region. Therefore, it is necessary to pattern the overcoat film so that the taper of the overcoat film is significantly inclined and that a difference between the actual thickness d of the liquid crystal layer and the optimal value thickness d of the same is as small as possible.

However, in the liquid crystal display, the transparent electrode generally tends to be arranged on the overcoat film. The transparent electrode is continuously formed on both the reflective display region and the transmissive display region over other adjacent dot regions. That is, the transparent electrode is an electrode wiring for driving liquid crystal molecules.

In a case where the taper of the overcoat film is significantly inclined, when the transparent electrode is formed using a sputtering method, etc., it is difficult to form the transparent electrode because the surface of the taper is significantly inclined. Therefore, the transparent electrode may be disconnected in the significantly inclined taper. This problem occurs in, particularly, an electrode wiring laid-around portion of the taper of the overcoat film formed in a region outside the display region. The electrode wiring laid-around portion is formed on the substrate for the liquid crystal display on the outer periphery of the substrate in order to electrically connect the transparent electrode corresponding to the display pixel to a driving IC. When disconnection occurs in the electrode wiring laid-around portion, signals are not transmitted to one entire scanning line, resulting in inferior display.

SUMMARY OF THE INVENTION

Therefore, in the transflective liquid crystal display of the present invention, the overcoat film preferably has at least two or more kinds of tapers including a larger inclined taper and a smaller inclined taper in order to improve contrast and a patterning property.

The present invention has been made in view of the above situations. Accordingly, an object of the present invention is to provide a color filter substrate capable of improving display quality such as the contrast and the patterning property by providing tapers having a plurality of different angles in the same layer, a method of manufacturing the same, and an electro-optical device, and an electronic apparatus using the color filter substrate.

In an aspect of the present invention, there is provided an electro-optical device, comprising a pair of substrates, an electro-optical material held between the pair of substrates by a sealant, and a resin layer provided on at least one substrate of the pair of substrates. Tapers of the resin layer have a plurality of different angles. The resin layer may be used as, for example, an overcoat film for controlling a cell gap (a gap between substrates) on a substrate used for a multi-gap type transflective liquid crystal display and alignment control protrusions for aligning the liquid crystal molecules of a multi-domain vertical alignment mode liquid crystal display (MVA-LCD). It is possible to reduce breakage of the electrode wiring and to improve the contrast by making the overcoat film have a plurality of different angles. Also, it is possible to improve the color characteristics of the liquid crystal display by making the alignment control protrusions have a plurality of different angles.

According to the electro-optical device, the resin layer is preferably a transparent resin layer. For example, an acryl-based transparent resin material may be used as the resin layer.

In an aspect of the electro-optical device, preferably, the resin layer is formed in a display region and a peripheral region of the display region, the tapers are formed in the display region and the peripheral region of the display region, and the inclination of the taper formed in the display region is larger than the inclination of the taper formed in the peripheral region of the display region.

In another aspect of the electro-optical device, preferably, the display region comprises a transmissive display region and a reflective display region, and the taper formed in the display region is formed at the boundary between the transmissive display region and the reflective display region.

Preferably, the taper in the peripheral region of the display region is formed in a region where an electrode wiring is formed. Therefore, it is possible to prevent breakage of the electrode wiring.

In another aspect of the electro-optical device, preferably, the taper of the display region has a first angle with the ratio of the base to the height being from 4:1 to 2:1, and the taper in the peripheral region of the display region has a second angle with the ratio of the base to the height being from 8:1 to 4:1. The resin layer may be used as, for example, the overcoat film. The first angle causes a larger inclined taper and the second angle causes a smaller inclined taper. It is possible to optimize the retardation and thereby improve the contrast by providing a larger inclined taper, for example, in the display region of the multi-gap type transflective liquid crystal display. It is also possible to reduce the breakage of the electrode wiring by providing a smaller inclined taper, for example, in the electrode wiring laid-around region of the multi-gap type transflective liquid crystal display.

According to another aspect of the electro-optical device, a red color filter, a green color filter, and a blue color filter are formed in the display region. Preferably, each color filter has thereon an alignment control protrusion formed of the resin layer. Therefore, it is possible to optimize the taper of the alignment control protrusion for each color of the color filter. That is, it is possible to optimize the initial tilt angles of the liquid crystal molecules for each color of the color filter. Therefore, according to the present invention, it is possible to improve the color characteristics, which cannot be improved only by controlling the color filters, of the liquid crystal display.

Preferably, the inclination of the taper of the resin layer on the red color filter is larger than the inclinations of the taper of the resin layer on the other color filter. Moreover, preferably, the inclination of the taper of the resin layer on the green color filter is larger than the inclination of the taper of the resin layer on the blue color filter.

Preferably, a base layer having a taper to form electrode wiring in the peripheral region of the display region is formed, and the inclination of the taper of the base layer is smaller than the inclination of the taper of the resin layer on the red color filter.

In another aspect of the present invention, there is provided a substrate for an electro-optical device, comprising a substrate and a resin layer provided thereon. Tapers of the resin layer preferably have a plurality of different angles.

In an aspect of the electro-optical device, the substrate for an electro-optical device preferably has alignment control protrusions for controlling the alignment of the electro-optical material. The electro-optical device may be, for example, the multi-domain vertical alignment mode liquid crystal display.

In another aspect of the present invention, an electronic apparatus preferably comprises the above-mentioned electro-optical device.

In another aspect of the present invention, a method of manufacturing a substrate for an electro-optical device preferably comprises a resin layer forming step of forming a resin layer on the substrate so that tapers of the resin layer have a plurality of different angles. It is possible to form, for example, the overcoat film provided on the substrate of the multi-gap type transflective liquid crystal display, and the alignment control protrusions of the multi-domain vertical alignment mode liquid crystal display by the resin layer forming step.

According to the method of manufacturing the substrate for the electro-optical device, a photolithographic mask having a full transmission region, a plurality of medium transmission regions, and a light-shielding region is preferably used in the resin layer forming step. It is possible to irradiate the substrate for the electro-optical device with light having various levels of light exposure by exposing the resin layer once using the photolithographic mask. Therefore, it is possible to effectively form the overcoat film provided on the substrate of the multi-gap type transflective liquid crystal display, and the alignment control protrusions of the multi-domain vertical alignment mode liquid crystal display.

In an aspect of a method of manufacturing the substrate for the electro-optical device, the resin layer is preferably patterned by exposing the resin layer several times using a photolithographic mask having a full transmission region and a light-shielding region in the resin layer forming step. That is, it is possible to form the overcoat film provided on the substrate of the multi-gap type transflective liquid crystal display or the alignment control protrusions of the multi-domain vertical alignment mode liquid crystal display by exposing the resin layer several times using the photolithographic mask under the condition where a proximity gap and the light exposure are optimal in each exposure processing. Also, it is possible to change the tapers by controlling the conditions such as the proximity gap and the light exposure using the same photolithographic mask, thereby reducing the manufacturing cost.

In another aspect of the method of manufacturing the substrate for the electro-optical device, the resin layer preferably is patterned by diffraction-exposing the resin layer using a photolithographic mask for diffraction exposure in the resin layer forming step. It is possible to irradiate the substrate with light having various levels of light exposure for the electro-optical device by performing the exposure processing once using the photolithographic mask. Therefore, it is possible to effectively form the overcoat film provided on the substrate of the multi-gap type transflective liquid crystal display, and the alignment control protrusions of the multi-domain vertical alignment mode liquid crystal display.

DETAILED DESCRIPTION OF PREFERRED EMBODIMENTS

Figure 1:
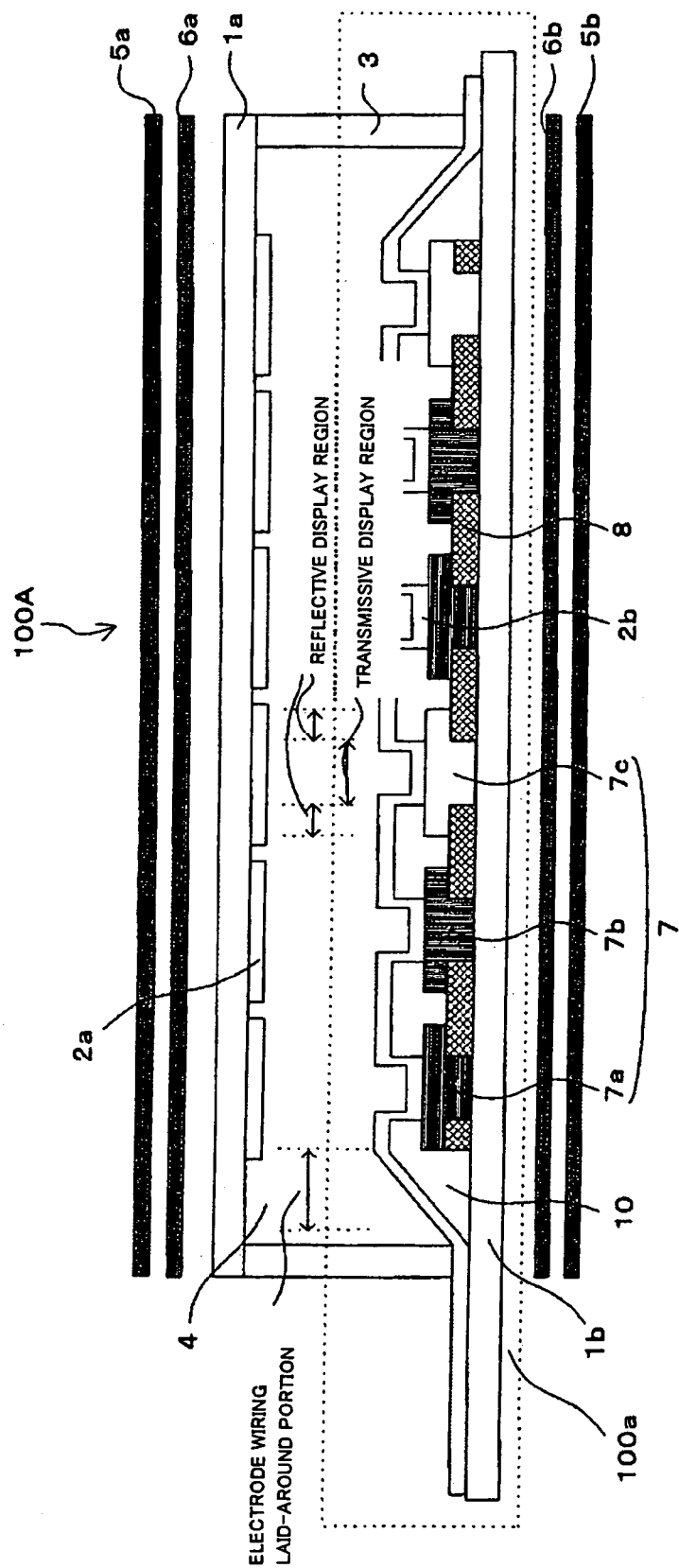
FIG. 1 is a sectional view of a liquid crystal display panel according to the present invention.

Hereinafter, embodiments of the present invention will be described with reference to the drawings. The following embodiments do not limit the present invention, but illustrate aspects of the present invention. Therefore, the embodiments can be optionally modified within the scope of the present invention. The present invention is characterized in that, when a layer such as an overcoat film provided on the substrate for the liquid crystal display is formed, the tapers at the edge of the overcoat layer are formed to have not a single taper angle but different taper angles.

Half-Tone Mask

A half-tone mask used when different tapers are formed in a film such as one overcoat film will now be described.

A phase shift method is used for the half-tone mask. The phase shift method will now be described.

The reduction in the propagation speed of light that passes through a material causes a shift in the phase of the light by the amount of reduction. It is possible to locally shift the phase by providing a transparent thin film on the mask.

The transparent thin film is referred to as the phase shifter in that the transparent thin film shifts a phase. The method is referred to as a phase shift method in which a portion (shifter) for shifting a phase of light is provided on a mask in which a pattern to be transferred is formed, and the interference between light components whose phases are shifted by passing through the shifter and light components whose phases are not shifted without passing through the shifter, is used.

As mentioned above, the phase shift method is used for the half-tone mask.

The half-tone mask can pass some of the light components through an absorber corresponding to a light-shielding portion. The phases of the light components that have passed through the absorber are inversed to those of the light components that do not pass through the absorber. Therefore, the phase inversion decreases light intensity. As a result, it is possible to perform a photolithographic process different from those in the conventional art. For example, a case where exposure is performed using a negative resist will now be described.

A region (a full transmission region) that transmits light to such an extent that a photoresist is completely hardened, a region (a medium transmission region) that transmits light to such an extent that the photoresist is insufficiently hardened, and a light-shielding region which does not harden the photoresist, can be formed in only one half-tone mask. The half-tone mask may make a structure in which the photoresist is desirably inclined by performing development processing after performing exposure. That is, the photoresist is thick in the full transmission region. The photoresist becomes thin in the medium transmission region depending on the light exposure. The photoresist is completely peeled off in the light-shielding region. As a result, the photoresist having a desirable inclined structure is manufactured.

The half-tone mask is a mask that enables the substrate to be irradiated with light having various levels of light exposure by performing the exposure processing once. That is, according to the present invention, it is possible to provide tapers having a plurality of different angles in the same layer on the substrate that constitutes the liquid crystal display by using the half-tone mask.

For example, in the multi-gap type transflective liquid crystal display panel, the half-tone mask enables an overcoat film to be formed on the color filter satisfactorily. Specifically, it is possible to improve the contrast of the liquid crystal display by making the taper of the overcoat film in an active area (a display pixel region) more inclined. It is also possible to manufacture an electrode wiring formed on the overcoat film satisfactorily by making the taper of the overcoat film in the electrode wiring laid-around portion in a peripheral region of the display region less inclined. Therefore, according to the present invention, it is possible to manufacture a transflective liquid crystal display panel having high display quality. This will be described in detail in a first embodiment.

The half-tone mask can control the tapers of the alignment control protrusions provided on the red, green, and blue color filters in a multi-domain vertical alignment mode liquid crystal display panel. In a vertical alignment mode, it is possible to optimize the initial tilt angles of liquid crystal molecules by controlling the tapers of the alignment control protrusions.

That is, it is possible to change the steepness of a voltage-transmittance curve by controlling the initial tilt angles (the pre-tilt angles) of the liquid crystal molecules and thereby improve insufficient color characteristics in the color filters. Specifically, the wavelength of the light that passes through the liquid crystal layer changes the optical characteristics of the liquid crystal layer due to the dependency of the liquid crystal on wavelength. That is, the voltage-transmittance curve varies in each color filter. It is possible to control the deviation of the voltage-transmittance curve by optimizing the initial tilt angles of the liquid crystal molecules and thereby improve the color reproducibility of the liquid crystal display. This will be described in detail in a second embodiment.

First Embodiment

The present embodiment relates to a color filter substrate provided in a multi-gap type transflective liquid crystal display panel. The color filter substrate has the structure in which color filters are arranged on a substrate such as glass or plastic, an overcoat film as a protective film is arranged on the color filters, and a transparent electrode is arranged on the overcoat film. The tapers of the overcoat film have a plurality of different angles. The larger inclined taper and the smaller inclined taper are caused by the angles.

Example 1 of a Liquid Crystal Display Panel

Figure 2:
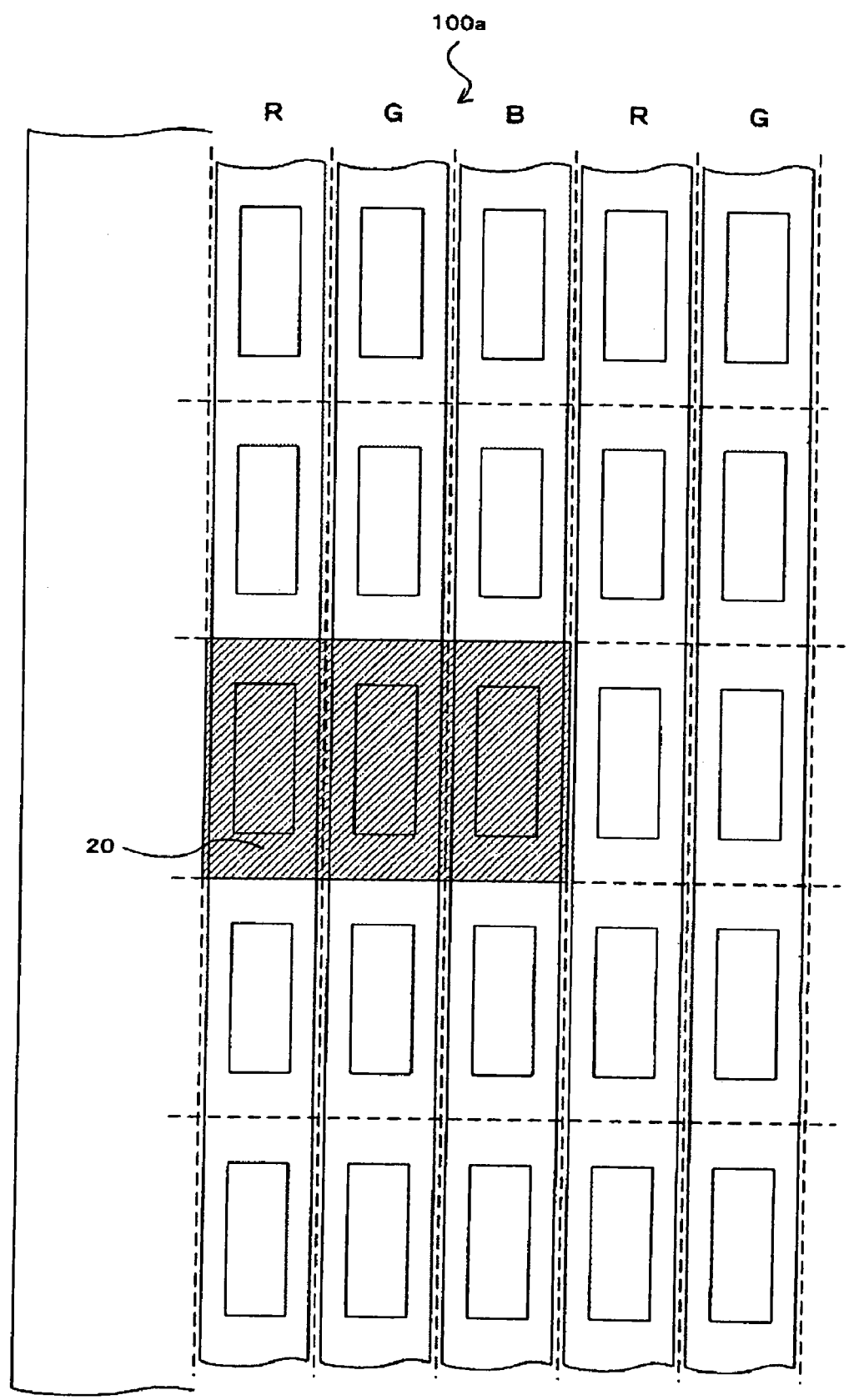
FIG. 2 is a plan view of a color filter substrate according to the present invention.
Figure 3A:
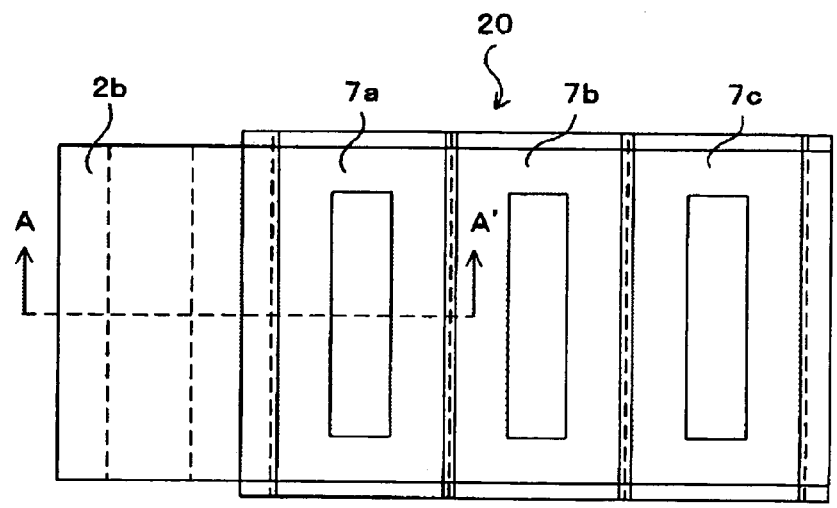
FIG. 3(a) is an enlarged view of the color filter substrate according to the present invention.
Figure 3B:
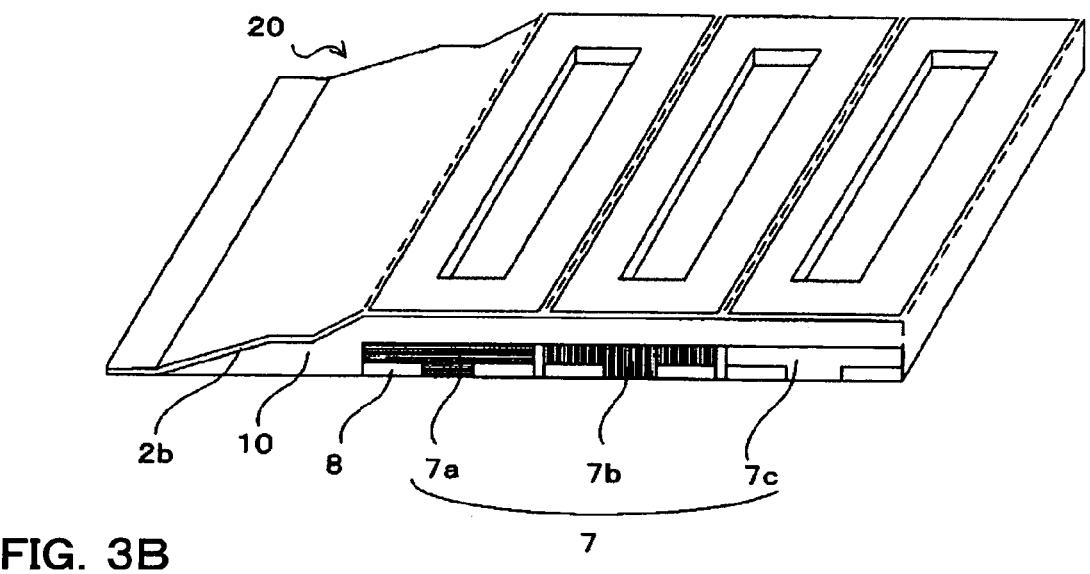
FIG. 3(b) is a perspective view of the color filter substrate according to the present invention.
Figure 3C:
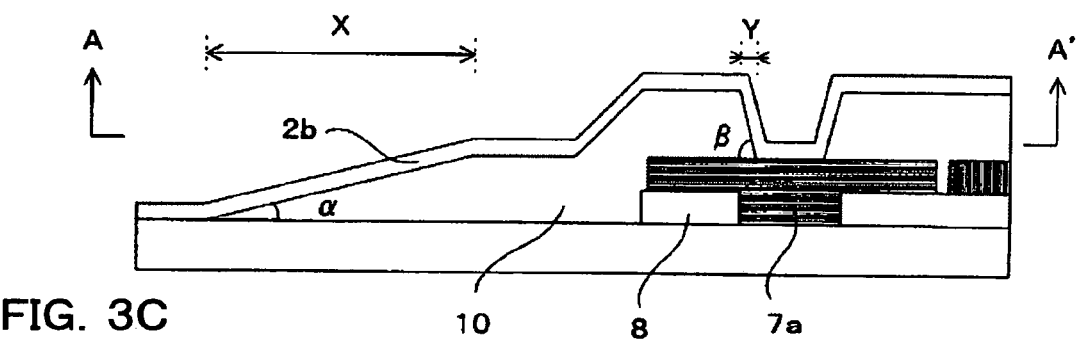
FIG. 3(c) is a sectional view of the color filter substrate according to the present invention.

The structure of a liquid crystal display panel having a color filter substrate according to the present embodiment will now be described with reference to FIGS. 1, 2, and 3. FIG. 1 is a sectional view of a multi-gap type transflective liquid crystal display panel in which the thickness of a liquid crystal layer between a transmissive display region and a reflective display region in one dot has an appropriate value. FIG. 2 is a plan view of the color filter substrate. FIG. 3(a) is an enlarged view of a part of the color filter substrate. FIG. 3(b) is a perspective view of a part of the color filter substrate. FIG. 3(c) is an enlarged sectional view of a part of the color filter substrate.

In a liquid crystal display panel 100A, substrates 1a and 1b, made of glass or plastic, are bonded to each other by a sealant 3. Liquid crystal 4 is encapsulated inside the liquid crystal display panel 100A. Further, a retardation film 6a and a polarizer 5a are sequentially arranged on the external surface of the substrate 1a. A retardation film 6b and a polarizer 5b are sequentially arranged on the external surface of the substrate 1b. A backlight (not illustrated) for emitting illumination light when transmissive display is performed is arranged below the polarizer 5b.

A color filter substrate 100a according to the present invention is arranged in the substrate 1b. The color filter substrate 100a has a light reflecting film 8 made of aluminum, an aluminum alloy, a silver alloy, etc., partially formed on the substrate 1b. The region in which the light reflecting film 8 is formed is a region used for reflective display (hereinafter, referred to as a reflective display region). When the reflective display is performed using external light, the external light is reflected by the light reflecting film 8 due to the reflective display region and is viewed by an observer.

Apertures are formed in the light reflecting film 8 at predetermined intervals. That is, the light reflecting film 8 is not formed in the apertures. The region of the apertures is a transmissive display region. The region where the light reflecting film 8 is formed, i.e., the region excluding the apertures, is the reflective display region.

In the reflective display region, color filters for reflective display are formed on the light reflecting film 8. On the other hand, color filters for transmissive display are formed in a region of the transmissive display region where the light reflecting film 8 is not provided. In FIG. 1, color filters for transmissive display are formed on the substrate 1b. In FIG. 1, the color filters for reflective display and the color filters for transmissive display are formed to have different thicknesses of the same material by controlling the chromaticities and the transmittances of the color filters. That is, a color filter material is formed in the aperture region of the light reflecting film 8. Therefore, the thicknesses of the color filters for transmissive display are larger than the thicknesses of the color filters for reflective display. Also, it is possible to separately form the color filters for reflective display and the color filters for transmissive display and to separately control the display color during reflective display and the display color during transmissive display.

FIG. 1 illustrates an example in which an overcoat film 10 is formed on the color filters for reflective display and is not formed on the color filters for transmissive display. As a result, it is possible to construct a multi-gap type transflective liquid crystal display panel capable of controlling the thickness of the liquid crystal layer and displaying images with improved visibility in both the transmissive display mode and the reflective display mode. It is also possible to construct a multi-gap type transflective liquid crystal display panel in which the overcoat film is formed on the color filters for transmissive display by optimizing the difference between the thickness of the overcoat film 10 on the color filters for reflective display and the thickness of the overcoat film on the color filters for transmissive display.

The tapers of the overcoat film 10 provided in the color filter substrate 100a according to the present invention have a plurality of different angles that cause a larger inclined taper and a smaller inclined taper. The region having the smaller inclined taper is an electrode wiring laid-around portion in the peripheral region of the display region illustrated in FIG. 3(c), i.e., the region X. In the smaller inclined taper, the ratio of the base to the height is preferably from 8:1 to 4:1. For example, the angle α of the smaller inclined taper may be about 14°. Further, the region having the larger inclined taper is the boundary between the reflective display region and the transmissive display region in a pixel, i.e., the region Y. In the larger inclined taper, the ratio of the base to the height is preferably from 4:1 to 2:1. The angle β of the larger inclined taper may be about 26°. The electrode wiring laid-around portion refers to a region in which the wiring connected to the electrodes formed in the display region and the wiring for connecting integrated circuits (ICs), junction terminals, etc., which constitutes a driving circuit, to each other, are formed.

In the color filter substrate 100a according to the present invention, the smaller inclined taper is preferably formed in the electrode wiring laid-around portion formed in the peripheral region of the display region, i.e., the region X. For example, the angle α of the smaller inclined taper may be about 14°. It is possible to perform the patterning of a transparent electrode 2b satisfactorily without causing breakage of electrode wiring by forming the smaller inclined taper in the electrode wiring laid-around portion (the region X). The larger inclined taper is preferably formed in the region Y in an active area, which is a display region. For example, the angle β of the larger inclined taper may be about 26°. According to the present invention, it is possible to improve the contrast of the liquid crystal display panel 100A by forming the larger inclined taper in the active area.

The angle of the taper of the overcoat film 10 can be measured using an optical microscope or an electron microscope. The angle of the taper of the overcoat film 10 may also be measured using a step difference meter or an AFM, which are other measuring methods.

Furthermore, in the reflective display region, a transparent electrode 2b made of indium tin oxide (ITO) is formed on the overcoat film 10. Further, in the transmissive display region, a transparent electrode 2b is formed on the color filters for transmissive display. The transparent electrode 2b is formed on the substrate 1b in a plurality of parallel stripes.

The transparent electrode 2b extends in the direction orthogonal to the transparent electrode 2a provided on the substrate 1a. Therefore, the components of the liquid crystal display panel 100A, which are included in a region where the transparent electrode 2a crosses the transparent electrode 2b, constitute one dot. In a color filter corresponding to the one dot, a red color filter 7a, a green color filter 7b, and a blue color filter 7c constitute a pixel. The color filters 7 according to the present invention are arranged not only in stripes as illustrated in FIG. 2, but may be arranged in various ways such as a delta arrangement and a diagonal arrangement.

As mentioned above, the multi-gap type color filter substrate 100a according to the present invention improves the contrast and reduces the breakage of the wiring. As a result, it is possible to provide a transflective liquid crystal display having high image quality.

Example 1 of a Mask

Figure 4A:
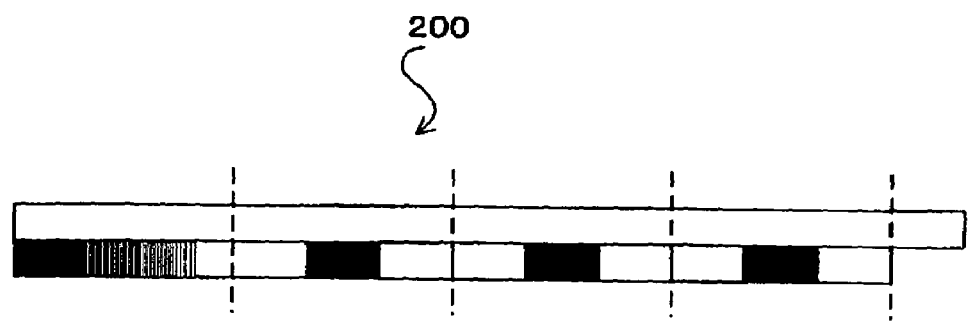
FIG. 4(a) illustrates an example of a photolithographic mask according to the present invention.
Figure 4B:
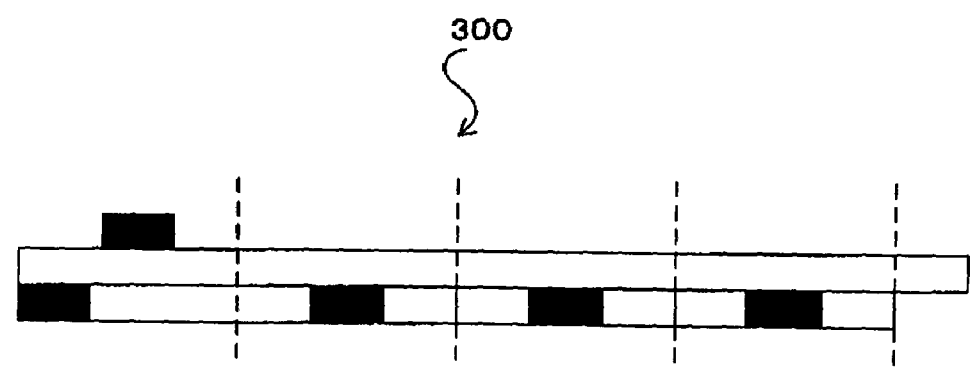
FIG. 4(b) illustrates an example of the photolithographic mask according to the present invention.

FIG. 4 illustrates an example of a mask used for the formation of the overcoat film according to the present embodiment. FIG. 4(a) illustrates a gradation slit photolithographic mask. FIG. 4(b) illustrates a double-sided photolithographic mask.

FIG. 4(a) illustrates a gradation slit photolithographic mask 200. The gradation slit photolithographic mask is a photolithographic mask in which the width of a slit and the gap pitch between slits are adjusted. Further, a half-tone mask using the same design of optical density as the gradation slit photolithographic mask 200 may be used.

In the transflective liquid crystal display panel according to the first embodiment, a multi-gap type in which the thickness of the liquid crystal layer between the transmissive display region and the reflective display region in one dot is appropriately set is adopted. Therefore, the overcoat film 10 is not provided in the transmissive display region in the color filter substrate 100a. The overcoat film 10 is arranged in the reflective display region. The thickness of the overcoat film 10 is preferably about 2 μm. The edge of the overcoat film 10 in one dot preferably has the larger inclined taper.

The thickness of the liquid crystal layer at the boundary (the region Y) between the reflective display region and the transmissive display region in the active area of the overcoat film 10 is different from the thickness of the liquid crystal layer in the transmissive display region or the reflective display region, which has an appropriate design value. That is, the retardation at the boundary (the region Y) between the transmissive display region and the reflective display region of the overcoat film 10 is different from the retardation in the transmissive display region or the reflective display region. Thus, if the range of the region Y is large, the contrast of the liquid crystal display panel reduces. Therefore, in order to minimize the range of the region Y, the larger inclined taper is preferably used for the edge of the active area of the overcoat film 10. The angle β of the larger inclined taper may be, for example, about 26°.

In the electrode wiring laid-around portion (the region X), in order to improve the patterning property of the transparent electrode 2b provided on the overcoat film 10, the smaller inclined taper is preferably used for the edge of the overcoat film 10. The angle α of the smaller inclined taper may be, for example, about 14°. It is possible to reduce the breakage of the wiring in the transparent electrode and to improve the patterning property of the transparent electrode by using the smaller inclined taper for the edge of the overcoat film 10.

In consideration of the above, when exposure is performed using, for example, a negative resist, a mask design in which a full transmission region corresponds with the reflective display region, a light-shielding region corresponds with the transmissive display region, and a medium transmission region corresponds with the electrode wiring laid-around portion, may be adopted for the gradation slit photolithographic mask 200 illustrated in FIG. 4(*a*). In short, exposure by the medium transmission region of the gradation slit photolithographic mask 200 is performed in the electrode wiring laid-around portion (the region X). The medium transmission region is under the condition that does not transmit light to such an extent that the overcoat film 10 is sufficiently hardened. That is, the resin material that is not yet hardened in the medium transmission region and the resin material in the light-shielding region are peeled off due to development processing. Therefore, it is possible to manufacture a gradual taper, i.e., the smaller inclined taper. Exposure by the full transmission region and the light-shielding region of the gradation slit photolithographic mask 200 is performed at the boundary (the region Y) between the reflective display region and the transmissive display region. The full transmission region transmits light to such an extent that the overcoat film 10 is sufficiently hardened. Therefore, only the resin material in the light-shielding region is peeled off due to development processing. As a result, it is possible to manufacture a steep taper, i.e., the larger inclined taper.

FIG. 4(*b*) is a double-sided photolithographic mask 300 using diffracted light. It is possible to perform a photolithographic process different from those of the conventional art because diffraction of light is used for the double-sided photolithographic mask 300. For example, a case in which exposure is performed using a negative resist will now be described. In the double-sided photolithographic mask 300, patterns are formed on both sides of the substrate. For example, patterns for diffracting light are formed on the surface of the photolithographic mask, i.e., on the light irradiating side. As mentioned above, in the multi-gap type transflective liquid crystal display, the larger inclined taper is preferably used for the edge (the region Y) of the overcoat film 10 in the reflective display region and the transmissive display region in the active area. Further, the smaller inclined taper is preferably used for the edge (the region X) of the overcoat film 10 of the electrode wiring laid-around portion. Therefore, the mask design in which the full transmission region corresponds with the reflective display region, the light-shielding region corresponds with the transmissive display region, and the medium transmission region (a double-sided pattern region using the diffraction of light) corresponds with the electrode wiring line laid-around portion, may be adopted for the double-sided photolithographic mask 300. The medium transmission region is under the condition that does not transmit light to such an extent that the overcoat film 10 is sufficiently hardened. That is, the resin material that is not yet hardened in the medium transmission region and the resin material in the light-shielding region are peeled off due to development processing. Therefore, it is possible to manufacture a gradual taper, i.e., the smaller inclined taper. At the boundary (the region Y) between the reflective display region and the transmissive display region, exposure by the light that passes through the full transmission region and the light-shielding region of the double-sided photolithographic mask 300 is performed. The full transmission region transmits light to such an extent that the overcoat film 10 is sufficiently hardened. Therefore, only the resin material in the light-shielding region is peeled off due to development processing. As a result, it is possible to manufacture a steep taper, i.e., the larger inclined taper.

As mentioned above, it is possible to effectively manufacture the color filter substrate 100*a* according to the present invention by using a photolithographic mask having the full transmission region, the medium transmission region, and the light-shielding region as in the gradation slit photolithographic mask 200 and the double-sided photolithographic mask 300.

Process of Manufacturing a Multi-Gap Type Color Filter Substrate

Figure 5:
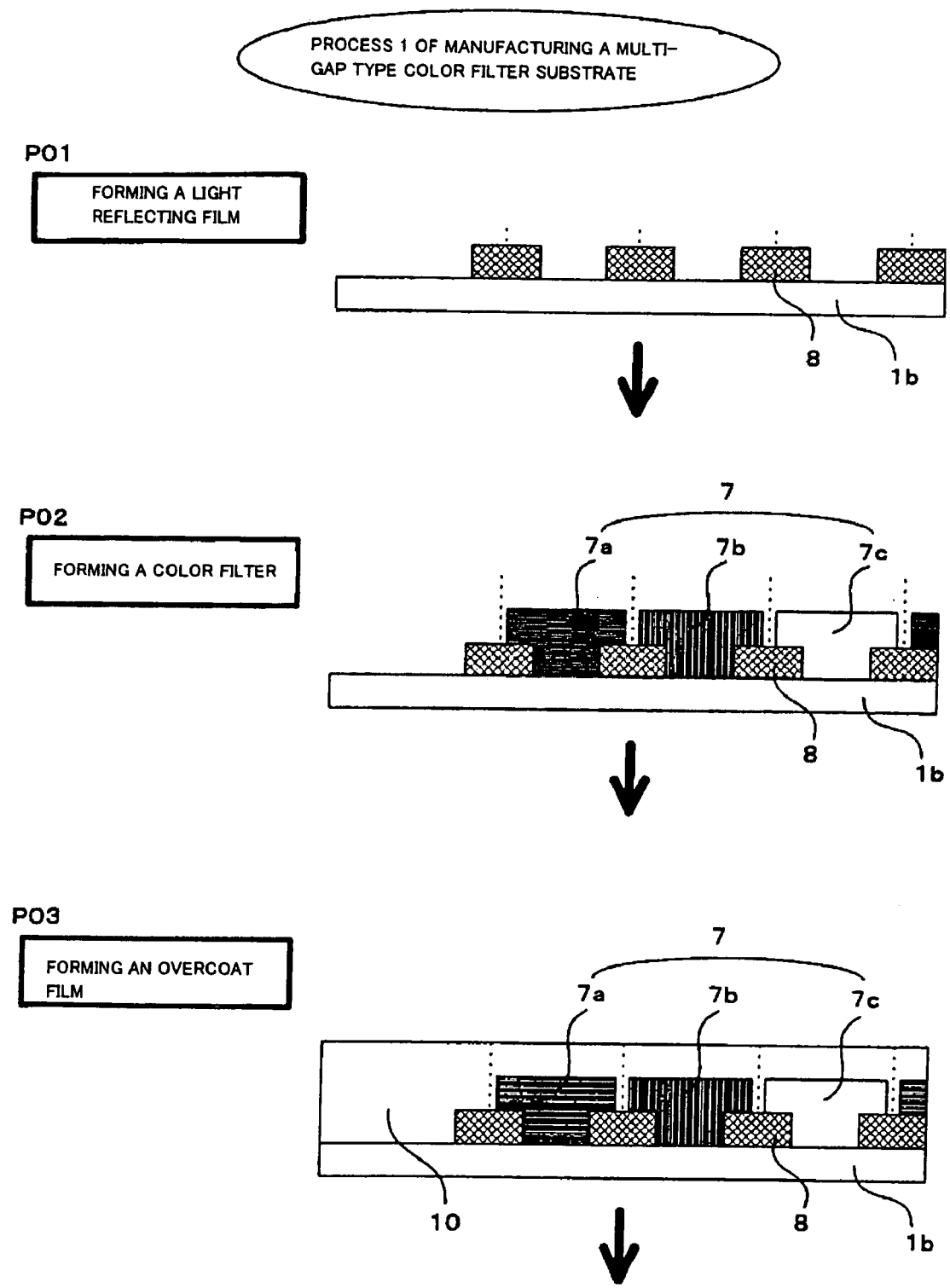
FIG. 5 illustrates processes of manufacturing the color filter substrate according to the present invention.
Figure 6:
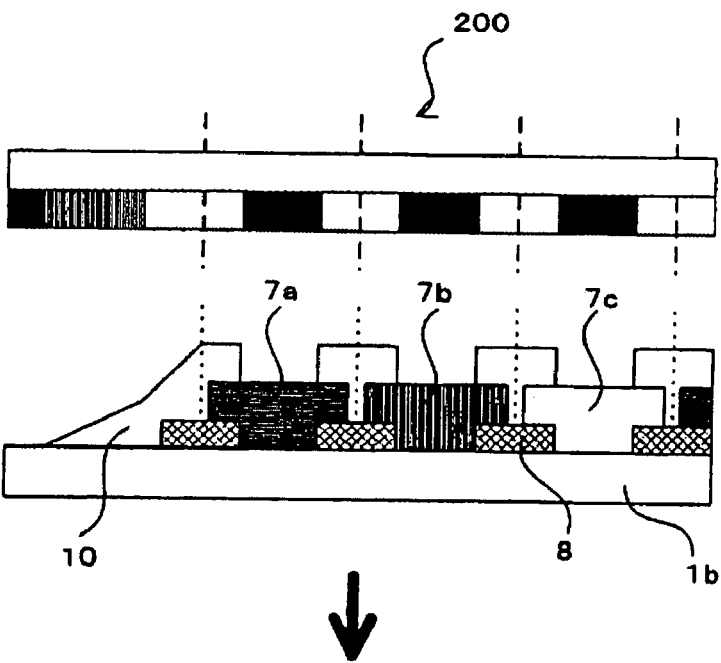
FIG. 6 illustrates processes of manufacturing the color filter substrate according to the present invention.
Figure 6:
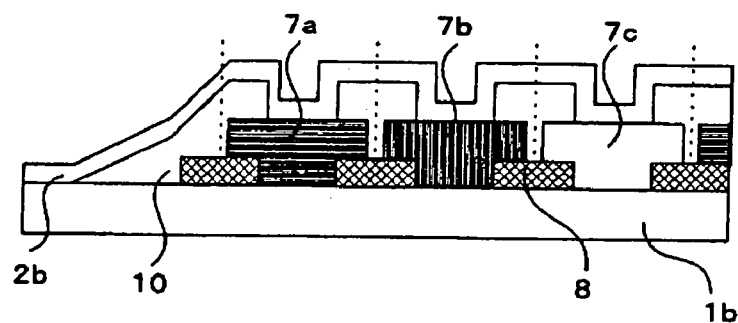

FIGS. 5 and 6 illustrate examples of processes of manufacturing a multi-gap color filter substrate according to the present invention.

A light reflecting film 8 is formed in the process P01 as illustrated in FIG. 5. The light reflecting film 8 is formed of an aluminum (Al) film by a sputtering method to a uniform thickness of, for example, about 0.2 μm. If necessary, a photolithographic method and an etching process are performed to manufacture a desired light reflecting film 8.

Next, color filters 7 are formed in the process P02. The entire surface of the substrate 1*b* is coated with a red color resist. The red color resist is formed of an acryl-based resin material or epoxy-based resin material colored by a pigment to a thickness of, for example, about 2 μm. Further, a red color filter 7*a* is formed in a desired position from a negative red color resist hardened by a photoreaction accompanying exposure. Next, the entire surface of the substrate 1*b* is coated with a green color resist. The green color resist is a negative resist and is formed to a thickness of, for example, about 2 μm. Then, a green color filter 7*b* is formed in a desired position from the negative green color resist. The substrate 1*b* is coated with a blue color resist. The blue color resist is a negative resist and is formed to a thickness of, for example, about 2 μm. A blue color filter 7*c* is formed in a desired position from the negative blue color resist.

As a result, as illustrated in FIGS. 1, 2, and 3, the red color filter 7*a*, the green color filter 7*b*, and the blue color filter 7*c* are formed in stripes.

Next, an overcoat film 10 is coated in the process P03. The overcoat film 10 is coated so as to cover the entire surface of the substrate 1*b* on which the color filters 7 are arranged. The overcoat film 10 is coated with an acryl-based transparent resin material to a thickness of, for example, about 2 μm.

Next, the overcoat film 10 is patterned in the process P04. For example, exposure is performed using the gradation slit photolithographic mask 200. At this time, the thickness d of the liquid crystal layer of the liquid crystal display panel 100A is optimized by making the thickness of the overcoat film 10 on the reflective display region different from the thickness of the overcoat film 10 on the transmissive display region.

Furthermore, since the gradation slit photolithographic mask 200 is used, the larger inclined taper is preferably used for the edge (the region Y) of the overcoat film 10 at the boundary between the reflective display region and the transmissive display region in a pixel. In the larger inclined taper, the ratio of the base to the height is preferably from 4:1 to 2:1. The angle β of the larger inclined taper is about 26°. It is possible to minimize the deviation of the retardation at the boundary between the reflective display region and the transmissive display region and to improve the contrast of the transflective liquid crystal display 100A by using the larger inclined taper.

When the gradation slit photographic mask 200 is used, the smaller inclined taper may be used for the edge (the region X) of the overcoat film 10 in the electrode wiring laid-around portion around the display region. In the smaller inclined taper, the ratio of the base to the height is preferably from 8:1 to 4:1. For example, the angle α of the smaller inclined taper is about 14°. It is possible to improve the patterning property of the transparent electrode 2b provided above the overcoat film 10 by using the smaller inclined taper. Therefore, it is possible to reduce the breakage (line defects) of the wiring of the transparent electrode of the liquid crystal display panel 100A and to provide high quality screen display.

Then, a transparent electrode 2b is formed in the process P05. Then, the multi-gap type color filter substrate 100a illustrated in FIG. 1 is formed.

Therefore, in the overcoat film 10 on the color filter substrate 100a according to the present invention, it is preferable that the larger inclined taper be used for the edge (the region Y) in the active area and the smaller inclined taper be used for the edge (the region X) of the electrode wiring laid-around portion. According to the present invention, it is possible to provide a multi-gap type transflective liquid crystal display panel capable of improving the contrast and of reducing line defects by using the color filter substrate 100a having the larger inclined taper and the smaller inclined taper.

Second Embodiment

The present embodiment relates to a color filter substrate having the alignment control protrusions, which is characterized in that a specific layer formed on the substrate for the liquid crystal display has different tapers. The alignment control protrusions have a plurality of inclined planes and are arranged on the color filters. The alignment control protrusions located on the respective dots of the red color filter, the green color filter, and the blue color filter are triangular (or elliptical) protrusions having different taper angles. According to the shapes of the protrusions on the respective color filters, preferably, the protrusion on the red color filter has the largest inclined taper, that the protrusion on the green color filter has a smaller inclined taper, and that the protrusion on the blue color filter has the smallest inclined taper.

Vertical Alignment Mode

The multi-domain vertical alignment mode liquid crystal display (MVA-LCD) employs a method in which display is controlled such that all of the liquid crystal molecules are arranged on an alignment film so as to vertically erect when a voltage is applied and that the liquid crystal molecules fall down when no voltage is applied. Further, the MVA-LCD employs a construction wherein that the directions in which the liquid crystal molecules fall are designed to be different from each other in adjacent regions in one dot, and the liquid crystal is aligned in a plurality of directions in one dot. The above multi-domain method is a technique for controlling the alignment of the liquid crystal molecules by providing protrusions for controlling the alignment of the liquid crystal molecules (the alignment control protrusions) on the substrate that constitutes the liquid crystal panel without performing rubbing processing. That is, the liquid crystal molecules are aligned in a plurality of directions in one dot due to the alignment control protrusions so that each region in which the liquid crystal molecules are aligned in the same direction has the same area. The alignment control protrusions are provided in both of the color filters and arrays. Therefore, the alignment control protrusions are alternately arranged when they are made cells. Also, the alignment control protrusions may be formed on any one substrate.

As mentioned above, according to the MVA-LCD, it is possible to make the liquid crystal display have a wide viewing angle by using a vertical alignment mode and the multi-domain method.

According to the present invention, it is possible to provide tapers having a plurality of different angles in the same layer. Therefore, it is possible to provide the alignment control protrusions having the optimal shapes for the red color filter, the green color filter, and the blue color filter. It is possible to optimize the initial tilt angles of the liquid crystal molecules by controlling the shapes of the tapers of the alignment control protrusions for the respective colors. That is, it is possible to change the steepness of the voltage-transmittance curve by controlling the initial tilt angles of the liquid crystal molecules. Therefore, it is possible to improve the insufficient color tone of the color filters.

For example, the initial tilt angle of the liquid crystal molecules on the blue color filter is small by making the taper of the protrusion of the blue color filter smaller inclined. The initial tilt angle of the liquid crystal molecules on the green color filter is larger than that of the liquid crystal molecules on the blue color by making the taper of the protrusion of the green color filter larger inclined than the taper of the protrusion of the blue color filter. The initial tilt angle of the liquid crystal molecules on the red color filter is much larger by making the taper of the protrusion of the red color filter much larger inclined. It is possible to control the deviation of the voltage-transmittance curve, which is caused when cell gaps are the same, and thereby to improve the color reproducibility of the liquid crystal display by optimizing the initial tilt angles of the liquid crystal molecules on the respective color filters.

Therefore, the shapes of the protrusions are preferably optimized so that the tilt angles of the liquid crystal molecules sequentially increase in the order of the blue color filter, the green color filter, and the red color filter.

That is, according to the present invention, it is possible to improve the color tone of the liquid crystal display panel by optimizing the initial tilt angles of the liquid crystal molecules. Therefore, according to the present invention, it is possible to provide a multi-domain vertical alignment mode liquid crystal display panel having high image quality.

Example 2 of a Liquid Crystal Display Panel

Figure 7:
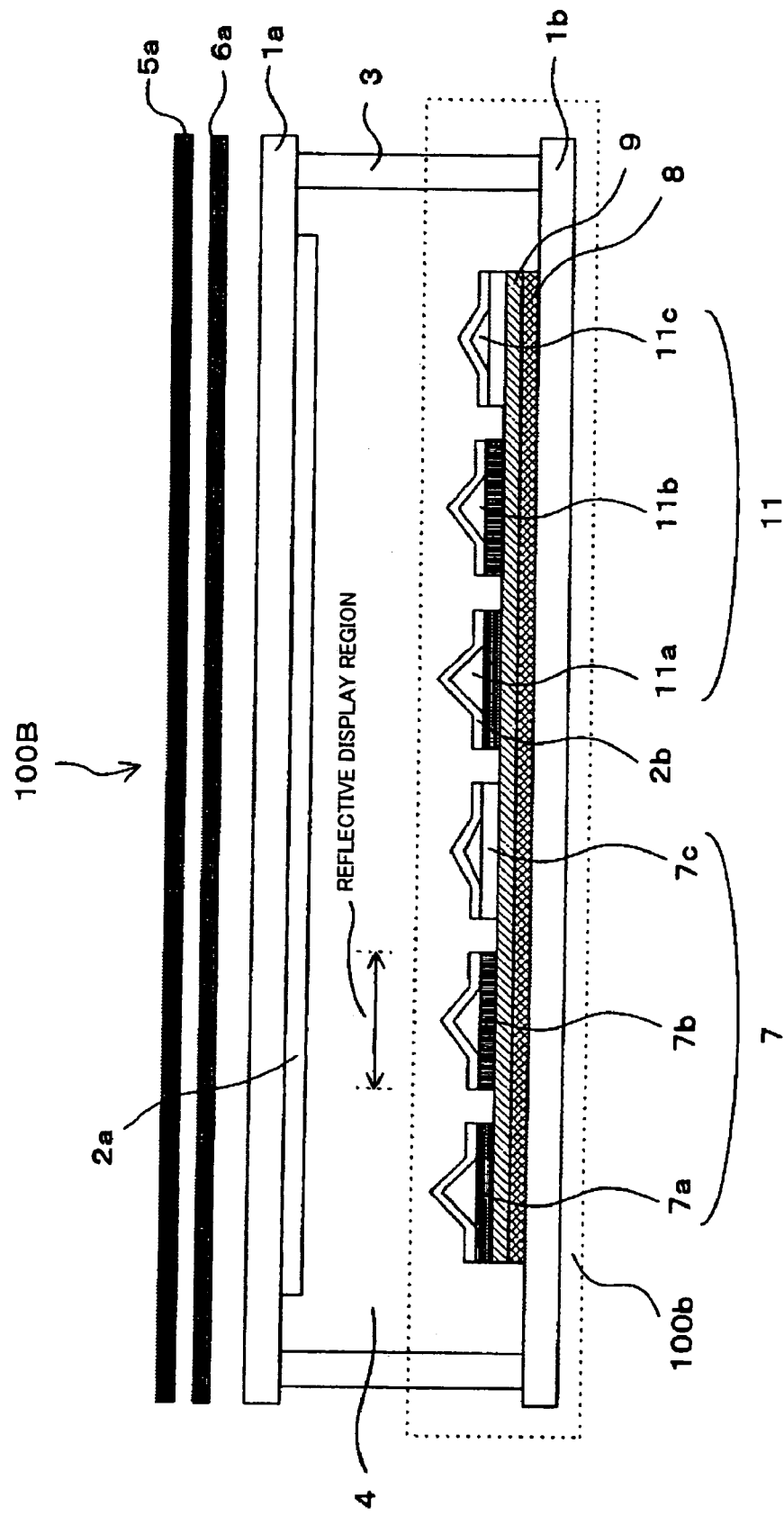
FIG. 7 is a sectional view of the liquid crystal display panel according to the present invention.
Figure 8:
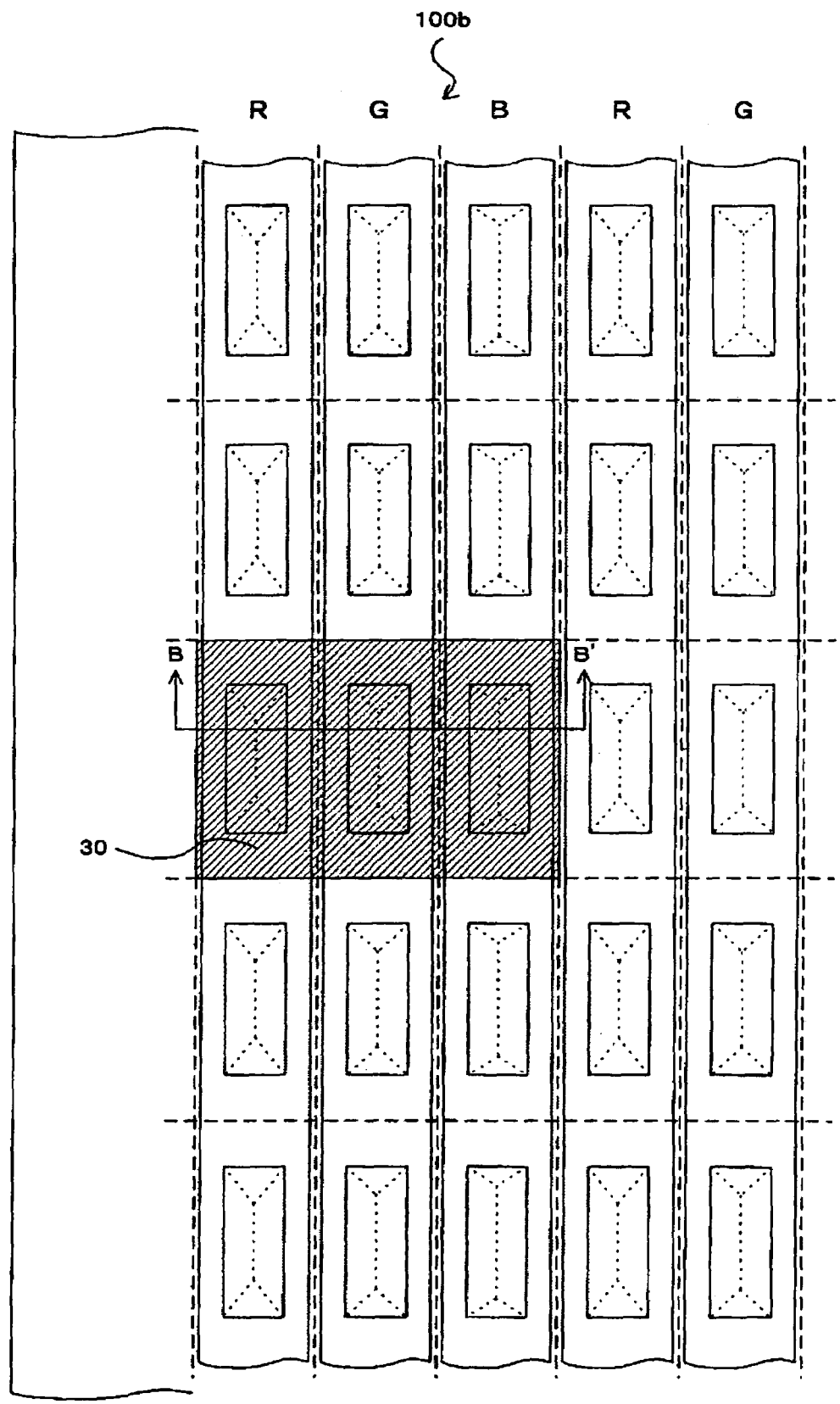
FIG. 8 is a plan view of the color filter substrate according to the present invention.
Figure 9A:
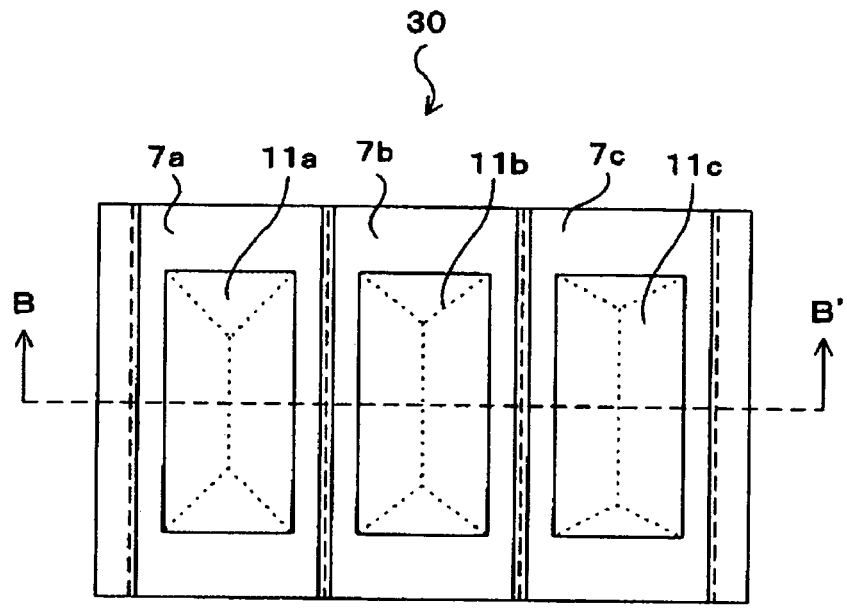
FIG. 9(a) is an enlarged view of the color filter substrate according to the present invention.
Figure 9B:
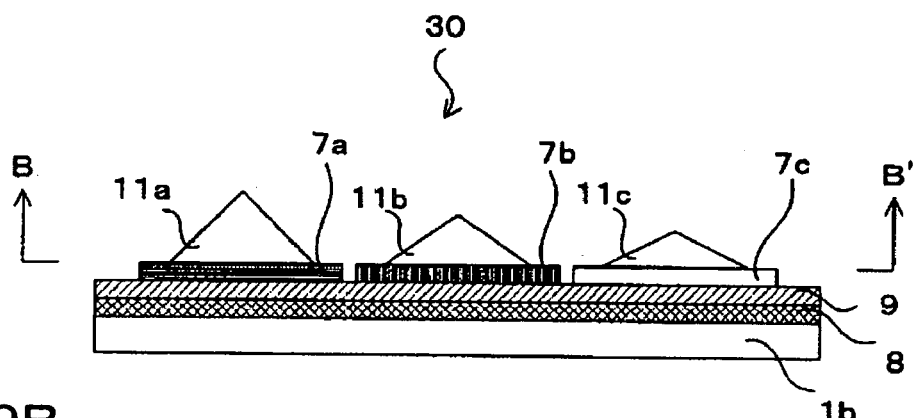
FIG. 9(b) is a sectional view of the color filter substrate according to the present invention.
Figure 9C:
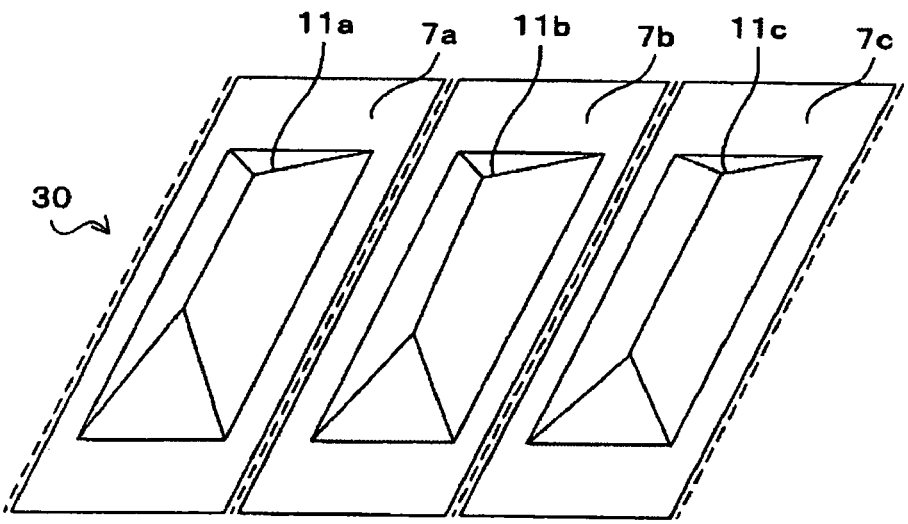
FIG. 9(c) is a perspective view of the color filter substrate according to the present invention.

A structure of the liquid crystal display panel having the color filter substrate according to the present embodiment will now be described with reference to FIGS. 7, 8, and 9. FIG. 7 is a sectional view of a multi-domain vertical alignment mode liquid crystal display panel. FIG. 8 is a plan view of a color filter substrate. FIG. 9(a) is an enlarged view of a part of the color filter substrate. FIG. 9(b) is a sectional view of a part of the color filter substrate. FIG. 9(c) is a perspective view of a part of the color filter substrate. Color filters according to the present invention are arranged not only in stripes as illustrated in FIG. 8, but may be arranged in various ways such as a delta arrangement and a diagonal arrangement.

The liquid crystal display panel 100B, illustrated in FIG. 7, is a reflective liquid crystal display panel. The liquid crystal display panel 100B includes, for example, a substrate 1a on which a transparent electrode 2a is formed and a substrate 1b, opposite to the substrate 1a, on which alignment control protrusions 11 and color filters 7 are arranged. Specifically, a light reflecting film 8 is provided on the substrate 1b. An overcoat film (an insulating film) 9 is arranged on the light reflecting film 8. The color filters 7, i.e., the red color filter 7a, the green color filter 7b, and the blue color filter 7c are provided on the overcoat (insulating) film 9.

The protrusions (the alignment control protrusions) 11 having a plurality of inclined planes for vertical alignment control are provided on the color filters 7 having the respective colors. According to the present invention, the alignment control protrusions 11 provided on the respective dots of the red color filter 7a, the green color filter 7b, and the blue color filter 7c may have different tapers. For example, preferably, the angle of the taper of the red color filter is 25 to 35°, the angle of the taper of the green color filer is 15 to 25°, and the angle of the taper of the blue color filer is 9 to 19°.

When the colored light components that had passed through the red color filer 7a, the green color filter 7b, and the blue color filter 7c, pass through the liquid crystal layer, it is difficult to control the color tone due to the dependency of the liquid crystal on wavelength. However, according to the present invention, it is possible to provide the liquid crystal display with improved color tone because of optimizing the initial tilt angles of the liquid crystal molecules by optimizing the shapes of the alignment control protrusions 11. Specifically, in the alignment control protrusions 11, the alignment control protrusion 11a on the red color filter 7a preferably has the largest inclined taper. The alignment control protrusion 11b on the green color filter 7b preferably has a smaller inclined taper than the taper of the alignment control protrusion 11a on the red color filter 7a. The alignment control protrusion 11c on the blue color filter 7c preferably has the smallest inclined taper. That is, the initial tilt angle of the liquid crystal molecules on the red color filter 7a is the largest. The initial tilt angle of the liquid crystal molecules on the green color filter 7b is smaller than that of the liquid crystal molecules on the red color filter 7a. The initial tilt angle of the liquid crystal molecules on the blue color filter 7c is the smallest. It is possible to reduce deviation of the transmittance (or the reflectivity) due to the light wavelength, which is caused by the dependency of the liquid crystal on wavelength, by optimizing the initial tilt angles of the liquid crystal molecules. In short, the deviation amount of the transmittance (the reflectivity)-voltage curve, which varies for each color of the color filters, is corrected by optimizing the initial tilt. Therefore, it is possible to adjust the color balance and thereby improve the white balance of the liquid crystal display.

Therefore, according to the present invention, it is possible to improve the color tone of the liquid crystal display panel by optimizing the tapers of the alignment control protrusions 11 of the respective color filters. The reason will now be described in detail.

Birefringence $\Delta n$ of the liquid crystal varies according to the wavelength of light resulting from the wavelength dispersion property of the liquid crystal. Therefore, when the retardation ($\Delta n \cdot d$) is on the x-axis and the transmittance (or the reflectivity) is on the y-axis, the curve gradually deviates due to the wavelength of incident light. That is, the transmitted light (the reflected light) that passes through the red color filter 7a, the green color filter 7b, and the blue color filter 7c gradually deviates in the respective wavelengths (the respective colored light components) due to the birefringence $\Delta n$ of the liquid crystal. However, it is possible to reduce the deviation, i.e., the difference in the transmittances (the reflectivities) in the respective wavelengths (the respective colored light components) of the transmitted light (the reflected light) that passes through the color filters 7 by controlling the thickness d of the liquid crystal layer on the color filters 7 and/or by controlling the initial tilt angles of the liquid crystal molecules on the color filters 7. That is, in a multi-domain vertical alignment mode, it is possible to optimize the initial tilt angles of the liquid crystal molecules on the color filters 7 by controlling the shapes of the alignment control protrusions 11, i.e., the tapers formed on the color filters 7.

In conventional photolithographic technique, the edges of the patterns in the same layer have almost the same angle. Therefore, it is difficult to optimize each taper by performing exposure processing once during the patterning of the tapers of the alignment control protrusions.

However, according to the present invention, it is possible to let the tapers have a plurality of different angles in the same layer. That is, it is possible to control the tapers of the alignment control protrusions 11 on the respective color filters 7. The optimization of the tapers of the alignment control protrusions 11 leads to the optimization the initial tilt angles of the liquid crystal molecules. As a result, it is possible to improve the optical characteristics of the liquid crystal display panel.

For example, the relationship between the retardations and the transmittances of the red light, the green light, and the blue light in a normally black (a black display liquid crystal display when no voltage is applied) will now be described. The minimum values of the transmittances of the red light, the green light, and the blue light are almost zero around $\Delta n \cdot d = 0.5$, but deviate due to the red light, the green light, and the blue light. Therefore, when the thickness d of the liquid crystal layer is selected so that the transmittance of the green light is minimum, the red light and the blue light leak out. As a result, for example, the black display becomes color tone tinged with purple as a whole. Therefore, the thickness d of the liquid crystal layer is preferably controlled so that the transmittances of the respective colors are minimum. Also, it is possible to improve the optical characteristics of the liquid crystal display panel by using another method for controlling the initial tilt angles of the liquid crystal molecules. That is, it is possible to manufacture the liquid crystal display 100B with preferable color tone by controlling the tapers of the alignment control protrusions 11 so that the initial tilt angles of the liquid crystal molecules sequentially increase in the order of the blue color filter 7c, the green color filter 7b, and the red color filter 7a.

Moreover, the angles of the tapers of the alignment control protrusions 11 can be measured using an optical microscope or an electron microscope. The angles of the tapers of the alignment control protrusions 11 may also be measured using a step difference meter or an AFM.

Furthermore, transparent electrodes 2b are arranged on the alignment control protrusions 11.

In the liquid crystal display 100B, the substrate 1a is bonded to the substrate 1b on which the alignment control protrusions 11 according to the present invention are arranged by a sealant 3. Liquid crystal 4 is encapsulated inside the liquid crystal display 10B. A retardation film 6a and a polarizer 5a are sequentially arranged on the external surface of the substrate 1a.

Moreover, in the liquid crystal display 100B according to the present invention, for example, switching elements such as a thin film diode (TFD) and a thin film transistor (TFT) may be provided on the substrate 1a. Also, the liquid crystal display may be applied to a structure in which the light reflecting film 8 is provided on the substrate on which the switching element is formed.

As mentioned above, the liquid crystal display 100B includes the color filter substrate on which the alignment control protrusions 11 having a plurality of different angles are provided. According to the present invention, it is also possible to control the shapes of the alignment control protrusions 11 in the respective color filters and to prevent the deviation in the white balance due to the dependency of the liquid crystal on wavelength.

Example 2 of a Mask

Figure 10A:
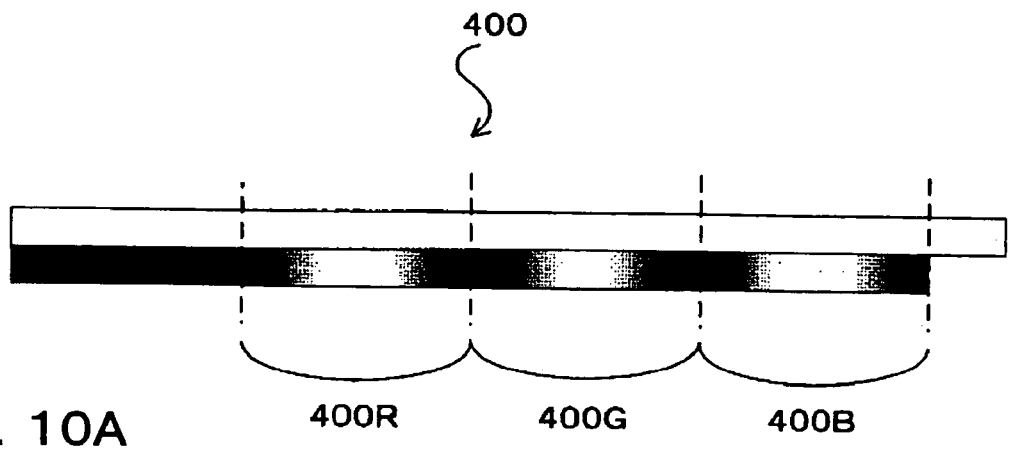
FIG. 10(a) illustrates an example of the photolithographic mask according to the present invention.
Figure 10B:
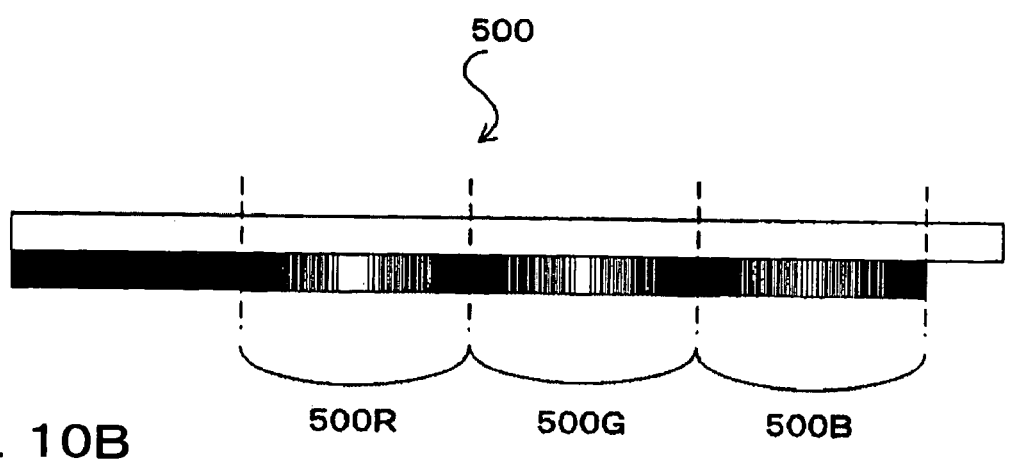
FIG. 10(b) illustrates an example of the photolithographic mask according to the present invention.
Figure 10C:
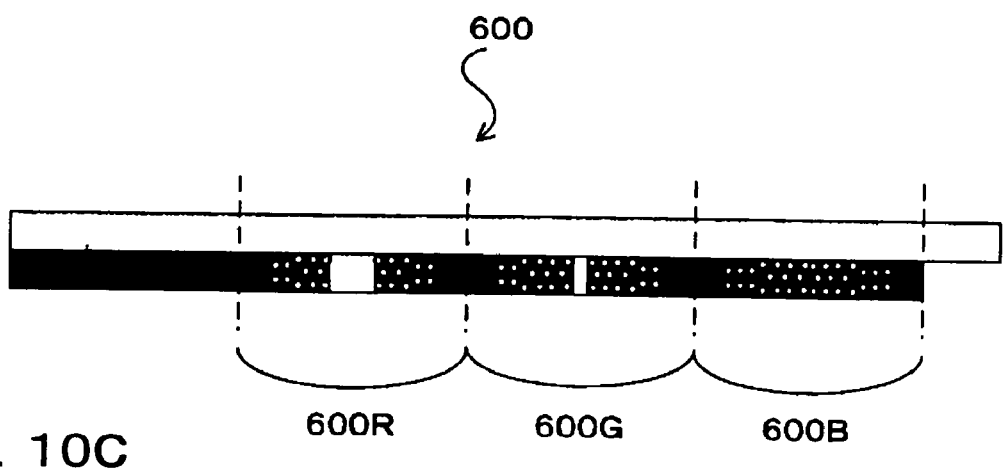
FIG. 10(c) illustrates an example of the photolithographic mask according to the present invention.

FIG. 10 illustrates examples of masks according to the present invention. FIG. 10(a) illustrates a half-tone mask. FIG. 10(b) illustrates a gradation slit photolithographic mask. FIG. 10(c) illustrates a photolithographic mask (hereinafter, a pore photolithographic mask) in which a medium transmission region is provided with pores using the diffraction of light.

FIG. 10(a) illustrates a half-tone mask 400. As mentioned above, the half-tone mask may include the full transmission region, the medium transmission region, and the light-shielding region. Therefore, according to the present invention, it possible to let the tapers in the same resin layer have a plurality of different angles by controlling the optical density of the half-tone mask 400.

The liquid crystal display panel 100B according to the second embodiment is the multi-domain vertical alignment mode liquid crystal display. It is possible to control the alignment of the liquid crystal molecules by providing the vertical alignment control protrusions 11 in one dot without performing the rubbing processing.

As mentioned above, the tapers of the vertical alignment control protrusions 11 according to the present invention can be controlled according to each color of the color filters 7. It is possible to optimize the initial tilt angles of the liquid crystal molecules and to improve the white balance of the liquid crystal display panel by controlling the tapers of the vertical alignment control protrusions 11.

Specifically, as illustrated in FIG. 9(b), the alignment control protrusion 11a on the red color filter 7a preferably has the largest inclined taper. The alignment control protrusion 11b on the green color filter 7b preferably has a smaller inclined taper than the taper of the alignment control protrusion 11a on the red color filter 7a. The alignment control protrusion 11c on the blue color filter 7c preferably has the smallest inclined taper. That is, the taper of the alignment control protrusion 11a is the largest inclined so that the initial tilt angle of the liquid crystal molecules on the red color filter 7a is the largest. The taper of the alignment control protrusion 11b is smaller inclined than the taper of the alignment control protrusion 11a so that the initial tilt angle of the liquid crystal molecules on the green color filter 7b is smaller than that of the liquid crystal molecules on the red color filter 7a. The taper of the alignment control protrusion 11c is preferably the smallest inclined so that the initial tilt angle of the liquid crystal molecules on the blue color filter 7c is the smallest. A base layer having the taper forming the electrode wiring laid-around portion of the peripheral region of the display region may be provided as in the first embodiment. In this case, the inclination of the tapers of the base layer is preferably at least smaller than that of the taper of the resin layer on the red color filter and is preferably smaller than the inclinations of the tapers of the resin layer on the red, green, and blue color filters.

In consideration of the above, the optical density design of the half-tone mask 400 will now be described. The present invention has been described using a negative resist as the resin material of the alignment control protrusions 11. However, according to the present invention, a positive resist may be used.

In the region 400R illustrated in FIG. 10(a), the alignment control protrusion 11a on the red color filter 7a is formed. In the region 400G, the alignment control protrusion 11b on the green color filter 7b is formed. In the region 400B, the alignment control protrusion 11c on the blue color filter 7c is formed. The sections of the alignment control protrusions 11 are triangular (or elliptical). Therefore, the full transmission region or a relatively high transmittance region is used in the apex of the alignment control protrusion. The medium transmission region is used over the inclined portion. The light-shielding region is used in a plane region.

As mentioned above, in the alignment control protrusions 11, the alignment control protrusion 11a on the red color filter 7a has the largest inclined taper. The alignment control protrusion 11b on the green color filter 7b has a smaller inclined taper than the taper of the alignment control protrusion 11a on the red color filter 7a. The alignment control protrusion 11c on the blue color filter 7c has the smallest inclined taper. Therefore, the transmittance of the region 400R is designed to be the largest. The transmittance of the region 400G is smaller than that of the region 400R. The transmittance of the region 400B is the smallest. That is, since the light exposure sequentially decrease in the order of 400R, 400G, and 400B, when development processing is performed, the films having the thicknesses corresponding to the respective light exposure are formed. Therefore, it is possible to obtain desired taper angles. In short, the alignment control protrusion 11a formed in the region 400R may have the largest inclined taper with the largest angle. The alignment control protrusion 11c formed in the region 400B may have the smallest inclined taper with the smallest angle.

FIG. 10(b) illustrates a gradation slit photolithographic mask 500. The gradation slit photolithographic mask 500 may have the same optical density design pattern as the half-tone mask 400. Therefore, the alignment control protrusion 11a formed in the region 500R may have the largest inclined taper with the largest angle. The alignment control protrusion 11c formed in the region 500B may have the smallest inclined taper with the smallest angle.

FIG. 10(c) is a pore photolithographic mask 600 using diffracted light. It is possible to perform a photolithographic process different from those of a conventional art. A case where exposure is performed using, for example, a negative resist will now be described. Pores are formed in the medium transmission region of the pore photolithographic mask 600. In a photolithographic mask 600 having the pores (circular apertures), light is attenuated because light is diffracted in the circular apertures. That is, the pore photolithographic mask 600 has the medium transmission region similarly to the half-tone mask and may have the full transmission region and the light-shielding region. For example, it is possible to form the medium transmission region by providing the circular aperture pattern on the edge of the same resin layer. In short, the pore photolithographic mask 600 may have the same optical density design pattern as the half-tone mask 400 or the gradation slit photolithographic mask 500. Therefore, the alignment control protrusion 11a formed in the region 600R may have the largest inclined taper with the largest angle. The alignment control protrusion 11c formed in the region 600B may have the smallest inclined taper with the smallest angle.

According to the present invention, it is possible to optimize the tapers of the edges of the alignment control protrusions 11 in the respective color filters using the half-tone mask 400, the gradation slit mask 500, or the pore photolithographic mask 600.

For example, the shapes of the alignment control protrusions 11 on the respective color filters 7 may be triangular (elliptical). In the shapes of the alignment control protrusions 11, preferably, the protrusion on the red color filter 7a has the largest inclined taper, the protrusion on the green color filter 7b has a smaller inclined taper than the taper of the protrusion on the red color filter 7a, and the protrusion on the blue color filter 7c has the smallest inclined taper. As a result, tapers having desired angles can be formed.

Figure 11:
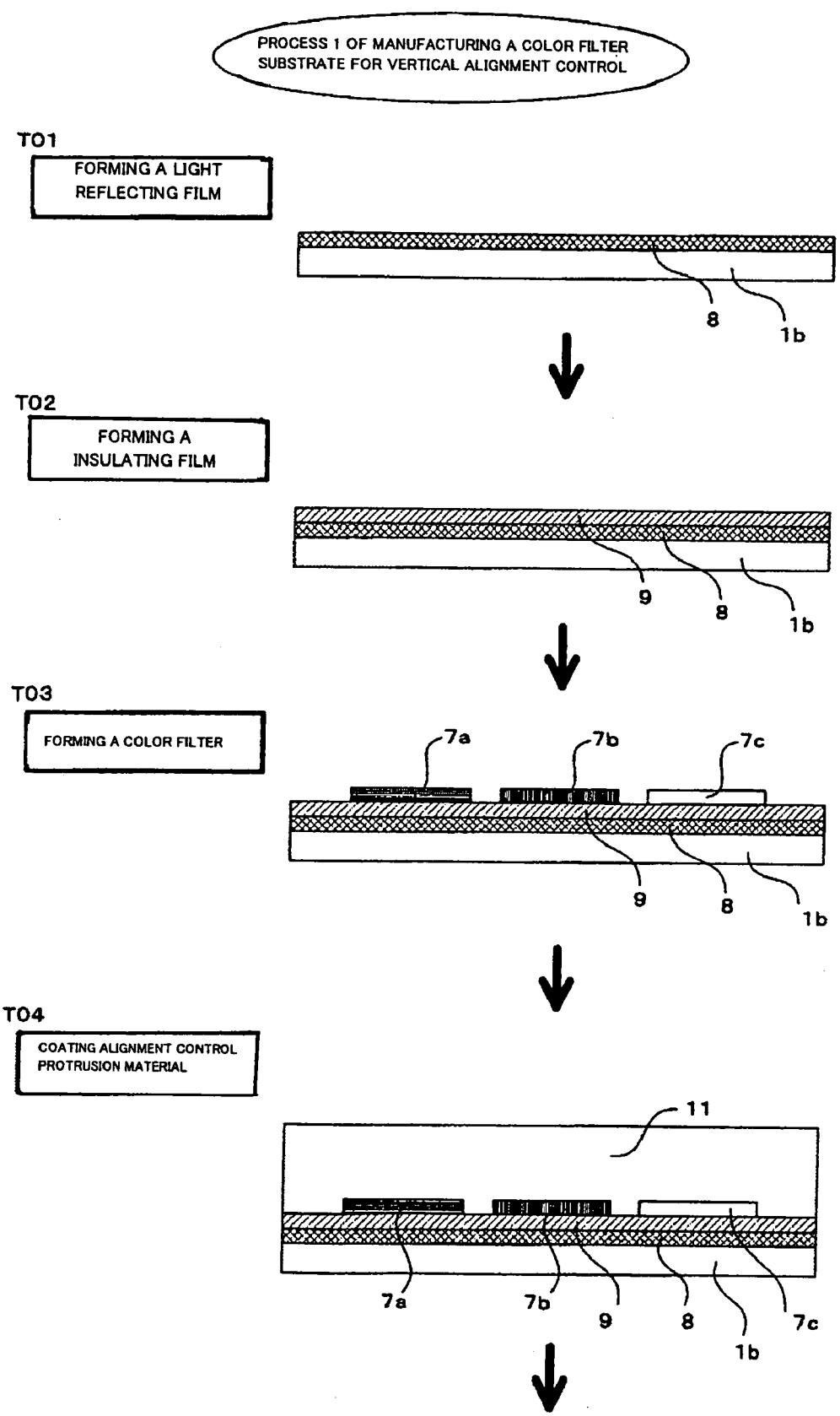
FIG. 11 illustrates processes of manufacturing the color filter substrate according to the present invention.
Figure 12:
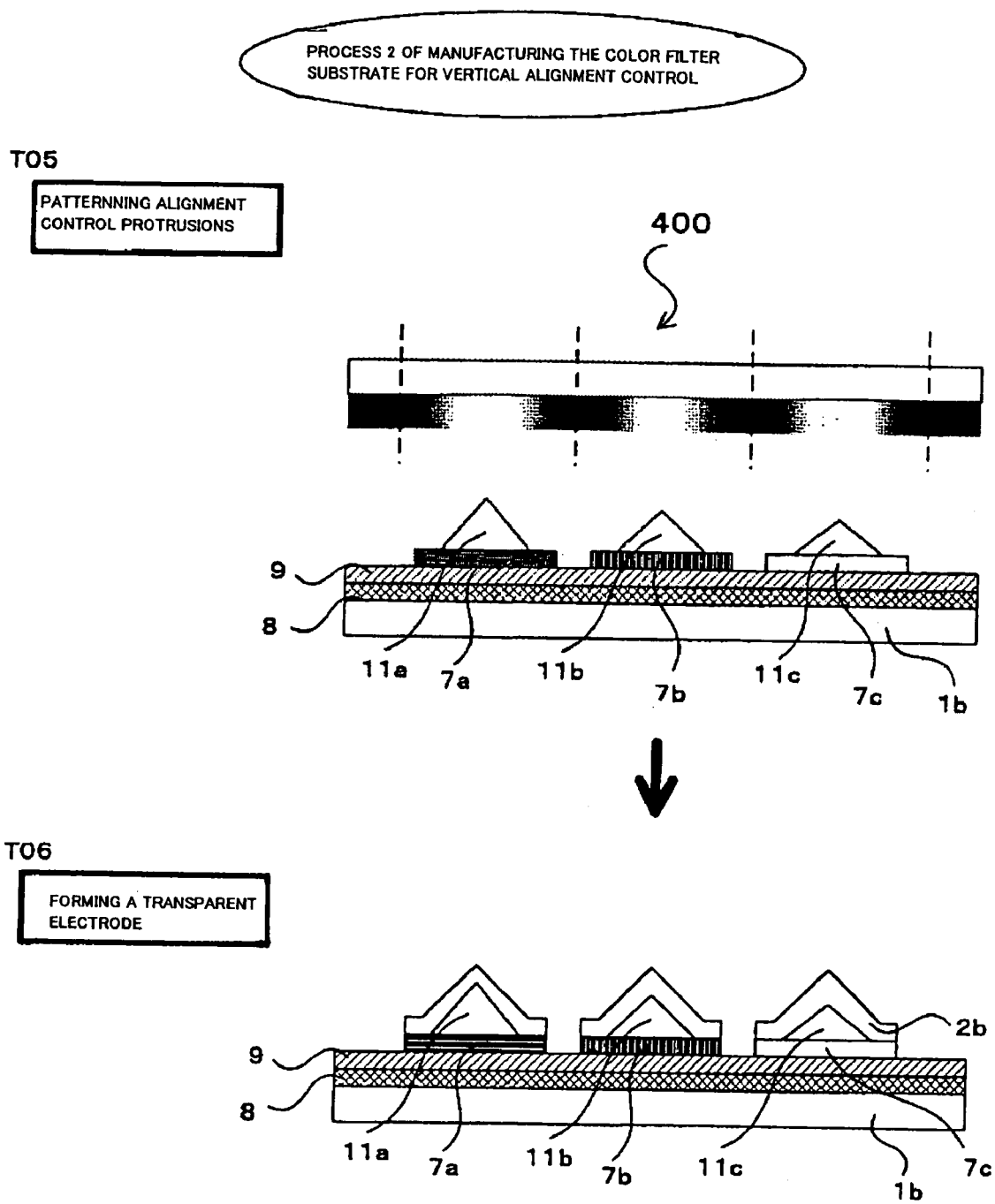
FIG. 12 illustrates processes of manufacturing the color filter substrate according to the present invention.

Process of Manufacturing a Color Filter Substrate for Vertical Alignment Control FIGS. 11 and 12 illustrate examples of processes of manufacturing the color filter substrate for vertical alignment control according to the present invention.

First, a light reflecting film 8 is formed in the process T01 in FIG. 11. For example, the light reflecting film is formed of an aluminum (Al) film by a sputtering method to a uniform thickness of, for example, about 0.2 μm. A desired pattern is formed by performing a photolithographic method and etching processing, if necessary.

Next, an insulating film 9 is formed in the process T02. The insulating film 9 may be formed of an inorganic material such as $SiO_2$ using a sputtering method. The insulating film 9 may be coated with organic resin by a spinner, etc.

Next, color filters are formed in the process T03. The entire surface of the substrate 1b is coated with a red color resist. The red color resist is formed of an acryl-based resin material or epoxy-based resin material colored by a pigment to a thickness of, for example, about 2 μm. Also, a red color filter 7a is formed in a desired position from a negative red color resist hardened by the photoreaction accompanying exposure. Next, the entire surface of the substrate 1b is coated with a green color resist. The green color resist is a negative resist and is formed to a thickness of, for example, about 2 μm. A green color filter 7b is formed in a desired position from the negative green color resist. The substrate 1b is coated with a blue color resist. The blue color resist is a negative resist and is formed to a thickness of, for example, about 2 μm. A blue color filter 7c is formed in a desired position from the negative blue color resist.

As a result, as illustrated in FIGS. 8 and 9, the red color filter 7a, the green color filter 7b, and the blue color filter 7c are formed in stripes.

An alignment control protrusion material is coated in the process T04. The entire surface of the substrate 1b on which the color filters 7 are arranged is coated with the alignment control protrusion material. Transparent resin material such as acryl is preferably used as the alignment control protrusion material.

Next, in the process T05, alignment control protrusions 11 are patterned. Exposure is performed using the above-mentioned half-tone mask 400. It is possible to optimize the angles of the tapers of the alignment control protrusions 11 on the color filters 7 by using the photolithographic mask 400. That is, it is possible to optimize the initial tilt angles of the liquid crystal molecules by controlling the angles of the tapers of the alignment control protrusions 11 provided on the red color filter 7a, the green color filter 7b, and the blue color filter 7c. That is, according to the present invention, it is possible to reduce the deviation of white balance, which is caused by the dependency of the liquid crystal on wavelength, by optimizing the initial tilt angles of the liquid crystal molecules of the color filters 7 and thereby improve the color tone of the liquid crystal display.

Then, a color filter substrate 100b that can be employed in the multi-domain vertical alignment mode (MVA), which is illustrated in FIG. 7, is manufactured by forming a transparent electrode (made of ITO) 2b in the process T06.

Therefore, it is possible to provide a liquid crystal display having a wide viewing angle and to provide a liquid crystal display having improved color tone and high image quality by using the color filter substrate 100b for alignment control according to the present invention.

Further, a protective film may be provided between the color filters 7 or the alignment control protrusions 11, and the transparent electrode 2b. In this case, a thin film is preferably used so that the protective film does not damage the shape of the alignment control protrusion layer.

Other Embodiments

The shapes of the alignment control protrusions 11 are not limited to those specifically mentioned above. That is, the alignments of the liquid crystal molecules may be other than the above-mentioned ones, and the shapes of the alignment control protrusions 11 are preferably selected depending on the desired alignment.

Method of Manufacturing a Liquid Crystal Display Panel

Figure 13:
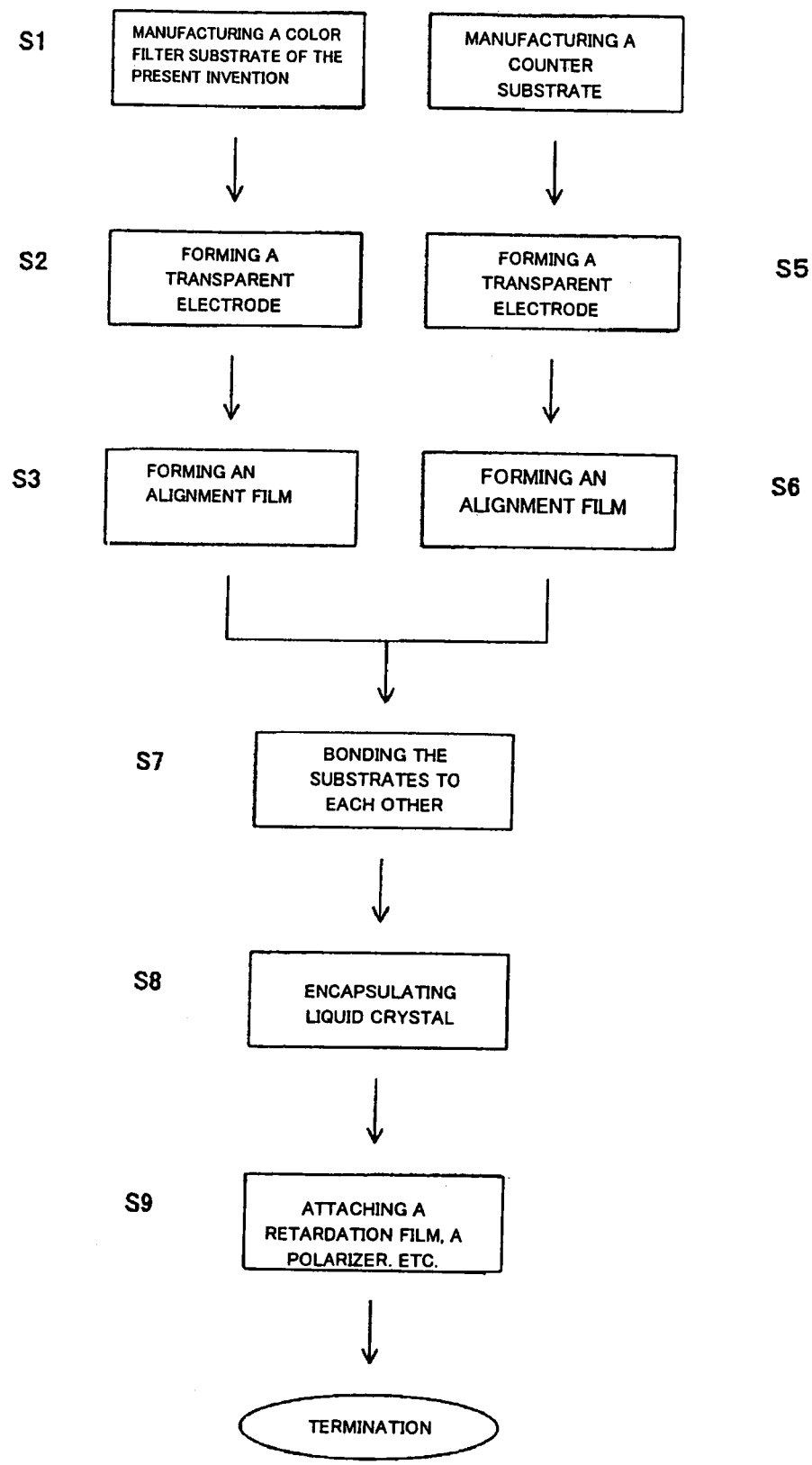
FIG. 13 illustrates processes of manufacturing the liquid crystal display panel to which the present invention is applied.

A method of manufacturing the liquid crystal display panel 100A as illustrated in FIG. 1 will now be described with reference to FIG. 13. FIG. 13 is a flowchart illustrating processes of manufacturing the liquid crystal display panel 100A. The liquid crystal display panel 100B can be manufactured similar to the flowchart illustrated in FIG. 13 except that the rubbing process can be omitted.

First, a multi-gap type color filter substrate 100a provided with the overcoat film 10 having different tapers in the same layer, is manufactured by the above-mentioned method (step S1). Furthermore, a transparent conductive film 2b is formed on the red color filter 7a, the green color filter 7b, the blue color filter 7c, and the overcoat film 10 by a sputtering method and is patterned by a photolithographic method, thereby forming a transparent electrode 2b (step S2).

The tapers of the overcoat film 10 have various angles. The larger inclined taper and the smaller inclined taper are caused by the angles. The larger inclined taper is used for the boundary (the region Y) between the transmissive display region and the reflective display region in the active area. It is possible to improve the contrast of the multi-gap type transflective liquid crystal display by using the larger inclined taper. Further, the smaller inclined taper is used for the electrode wiring laid-around portion (the region X). It is possible to prevent the occurrence of breakage of the wiring of the transparent electrode 2b provided on the overcoat film 10 by using the smaller inclined taper. Therefore, it is possible to provide a high quality liquid crystal display.

Thereafter, an alignment film made of polyimide resin, which is not illustrated, is formed on the transparent electrode 2b (step S3).

On the other hand, a counter substrate 1a is manufactured (step S4), a transparent electrode 2a is formed by the similar method (step S5), and an alignment film that is not illustrated is formed on the transparent electrode 2b (step S6).

Then, a panel structure is formed by bonding the substrate 1a to the substrate 1b by the sealant 3 (step S7). The substrates 1a and 1b can be bonded to each other to be separated from each other with a specified gap by spacers (not illustrated) that are dispersed between the substrates 1a and 1b.

Thereafter, the liquid crystal 4 is implanted from the aperture (not illustrated) of the sealant 3. The aperture of the sealant 3 is encapsulated by an encapsulant such as ultraviolet (UV) ray hardened resin (step S8). After forming a main panel structure by doing so, a retardation film, a polarizer, etc., is attached to the external surface of the panel structure by a method such as bonding (step S9), thereby completing the multi-gap type transflective liquid crystal display panel 100A as illustrated in FIG. 1.

Electronic Apparatuses

An embodiment of a case where the liquid crystal display panels 100A and 100B using the color filter substrate according to the present invention are used as the display of an electronic apparatus will now be described.

Figure 14:
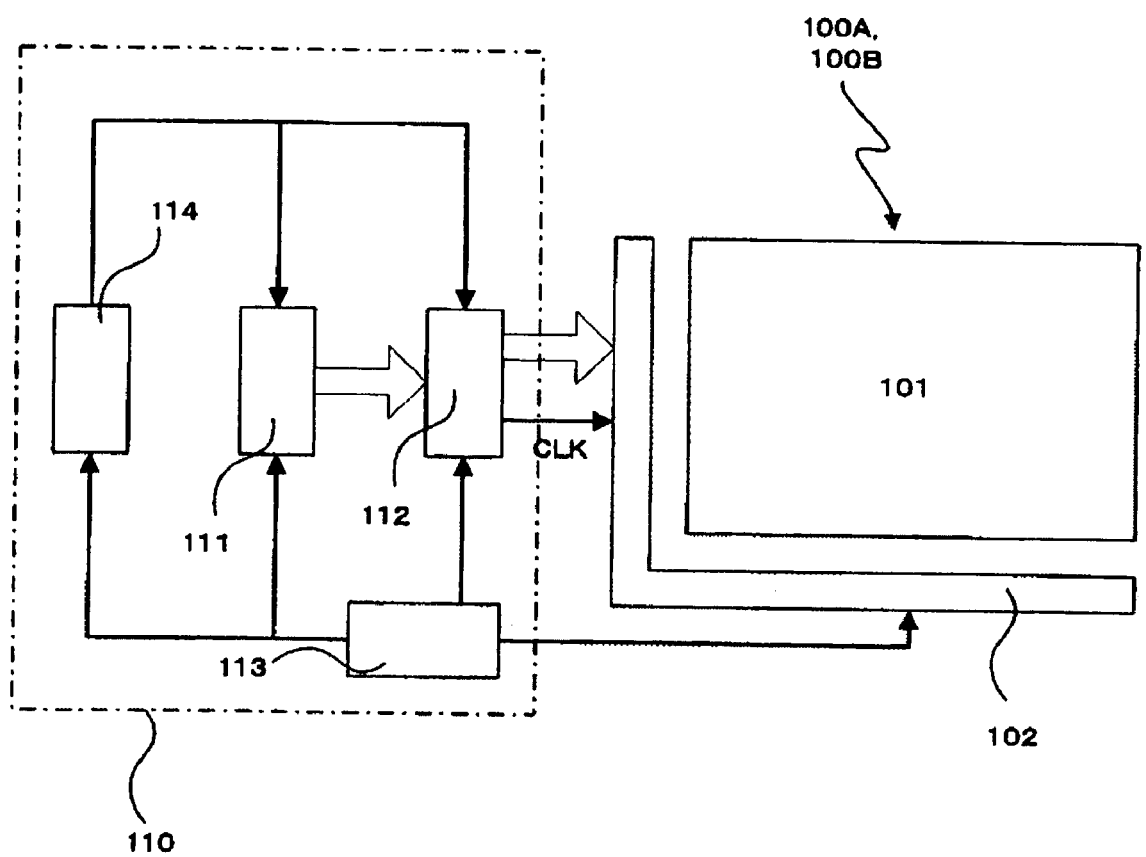
FIG. 14 illustrates a structure of an electronic apparatus using the liquid crystal display panel to which the present invention is applied.

FIG. 14 is a schematic block diagram illustrating the general construction of the present embodiment. The electronic apparatus includes the liquid crystal display panels 100A and 100B, and control means 110 for controlling the liquid crystal display panels 100A and 100B. Each of the liquid crystal display panels 100A and 100B comprises a panel structure 101, and a driving circuit 102, which includes a semiconductor integrated circuit (IC), etc. The panel structure 101 and the driving circuit 102 are separated from each other for the sake of convenience. The control means 110 includes a display information output source 111, a display information processing circuit 112, a power supply circuit 113, and a timing generator 114.

The display information output source 111 includes a memory consisting of read only memory (ROM) or random access memory (RAM), storage unit consisting of a magnetic recording disk or an optical recording disk, and a tuning circuit for tuning digital picture signals. The display information output source supplies the display information to the display information processing circuit 112 based on various clock signals generated by the timing generator 114 in the form of picture signals having a predetermined format.

The display information processing circuit 112 includes known various circuits such as a serial-parallel converting circuit, an amplifying and inverting circuit, a rotation circuit, a gamma correcting circuit, and a clamping circuit, processes input display information. The display information processing circuit supplies the image information to a driving circuit 102 together with clock signals CLK. The driving circuit 102 includes a scanning line driving circuit, a data line driving circuit, and a test circuit. The power supply circuit 113 supplies a predetermined voltage to the above-mentioned components.

Specific examples of an electronic apparatus to which the liquid crystal display panel according to the present invention can be applied, will now be described with reference to FIG. 15.

Figure 15A:
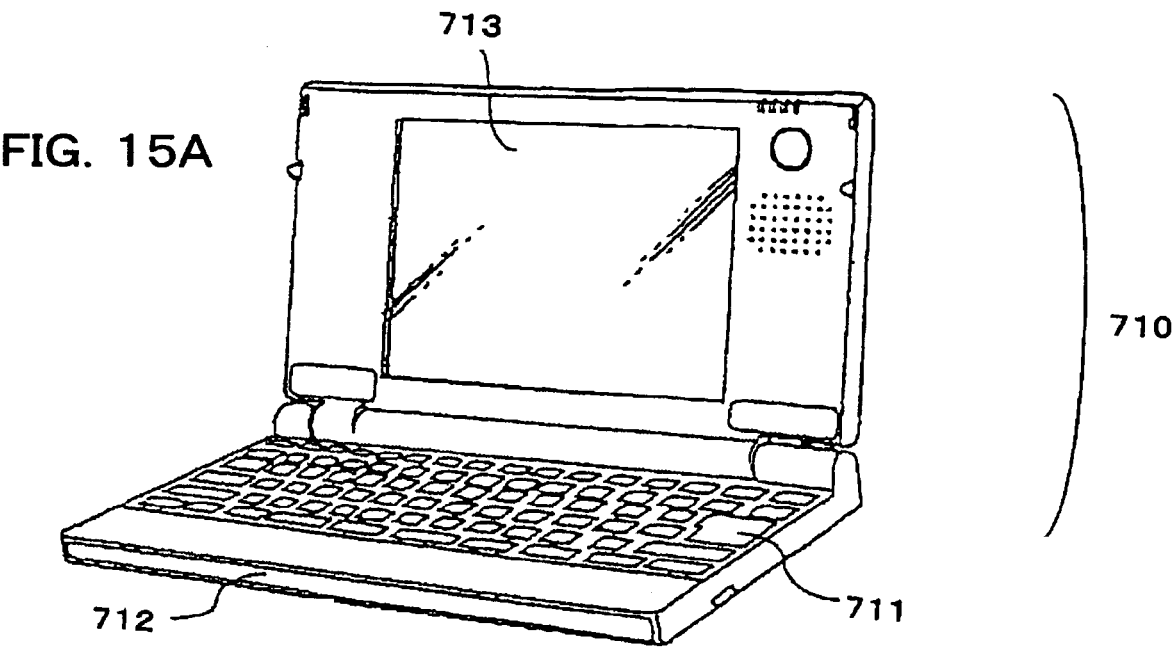
FIGS. 15(a) and 15(b) illustrate examples of electronic apparatuses comprising the liquid crystal display panel to which the present invention is applied.

First, an example of applying the liquid crystal display panel according to the present invention to the display of a portable personal computer (a so-called notebook computer) will be described. FIG. 15(a) is a perspective view illustrating a construction of the personal computer. As illustrated in FIG. 15(a), the personal computer 710 includes a main body 712 having a keyboard 711, and a display unit 713 to which the liquid crystal display panel according to the present invention is applied.

Figure 15B:
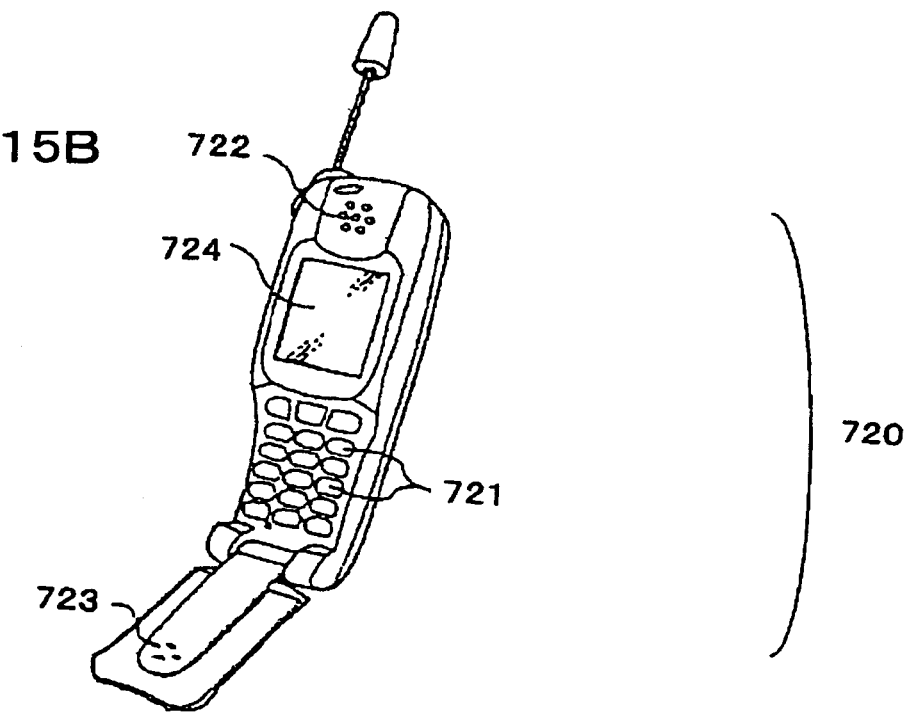

An example of applying the liquid crystal display panel according to the present invention to the display unit of a cellular phone will now be described. FIG. 15(b) is a perspective view illustrating a construction of the cellular phone.

As illustrated in FIG. 15(b), a cellular phone 720 includes various manipulation buttons 721, an earpiece 722, a mouthpiece 723, and a display unit 724 to which the liquid crystal display panel according to the present invention is applied.

Moreover, various electronic apparatuses to which the liquid crystal display panel according to the present invention can be applied include, among others, liquid crystal televisions, view finder type or monitor direct-viewing type video tape recorders, car navigation devices, pagers, electronic organizers, electronic calculators, word processors, workstations, videophones, POS terminals, digital still cameras, etc., in addition to the personal computer illustrated in FIG. 15(a) and the cellular phone illustrated in FIG. 15(b).

Modification 1

Further, the electro-optical device according to the present invention can be also applied to an active-matrix-type liquid crystal display panel (for example, a liquid crystal display panel having a thin film transistor (TFT) or a thin film diode (TFD) as a switching element) as well as a passive matrix type liquid crystal display panel. Similarly, the present invention can be applied to various electro-optical devices such as electroluminescent devices, organic electroluminescent devices, plasma displays, electrophoresis displays, field emission displays, and surface-conduction electron-emitter displays as well as the liquid crystal display panels.

Modification 2

The liquid crystal display panel according to the present invention can be manufactured by any other method of optimizing the conditions such as a proximity gap and the light exposure and performing exposure several times using the photolithographic mask consisting of the light-shielding region and the full transmission region in addition to the above-mentioned method using the photolithographic mask. Also, it is possible to change the angles of the tapers in the same layer further by changing the proximity gap and the light exposure in the same mask, thereby reducing the manufacturing cost.

Advantages

As mentioned above, it is possible to improve the visibility of the electro-optical device according to the present invention.

The entire disclosure of Japanese Patent Application Nos. 2003-009908 filed Jan. 17, 2003 and 2003-372603 filed Oct. 31, 2003 are incorporated by reference.

What is claimed is:

1. An electro-optical device comprising:
a pair of substrates;
an electro-optical material held between the pair of substrates by a sealant;
a resin layer provided on at least one substrate of the pair of substrates in both a display region and a peripheral region outside of the display region, the resin layer including tapers with a larger inclination in the display region than in the peripheral region; and
an electrode wiring formed between the electro-optical material and the tapers of the resin layer at both the display region and the peripheral region;
wherein the display region comprises a transmissive display region and a reflective display region; and
wherein the taper formed in the display region is formed at a boundary between the transmissive display region and the reflective display region.

* * * * *